US011929085B2

(12) United States Patent
Biswas et al.

(10) Patent No.: US 11,929,085 B2
(45) Date of Patent: Mar. 12, 2024

(54) METHOD AND APPARATUS FOR CONTROLLING ENHANCEMENT OF LOW-BITRATE CODED AUDIO

(71) Applicants: DOLBY INTERNATIONAL AB, Amsterdam Zuidoost (NL); DOLBY LABORATORIES LICENSING CORPORATION, San Francisco, CA (US)

(72) Inventors: Arijit Biswas, Schwaig bei Nuernberg (DE); Jia Dai, Beijing (CN); Aaron Steven Master, San Francisco, CA (US)

(73) Assignees: DOLBY INTERNATIONAL AB, Dublin (IE); DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/270,053

(22) PCT Filed: Aug. 29, 2019

(86) PCT No.: PCT/US2019/048876

§ 371 (c)(1),
(2) Date: Feb. 22, 2021

(87) PCT Pub. No.: WO2020/047298

PCT Pub. Date: Mar. 5, 2020

(65) Prior Publication Data

US 2021/0327445 A1 Oct. 21, 2021

Related U.S. Application Data

(60) Provisional application No. 62/850,117, filed on May 20, 2019, provisional application No. 62/733,409, filed on Sep. 19, 2018.

(30) Foreign Application Priority Data

Aug. 30, 2018 (WO) ................ PCT/CN2018103317

(51) Int. Cl.
*G10L 19/24* (2013.01)

(52) U.S. Cl.
CPC .................................. *G10L 19/24* (2013.01)

(58) Field of Classification Search
CPC ...................................................... G10L 19/24
See application file for complete search history.

(56) References Cited

U.S. PATENT DOCUMENTS 5,185,848 A 2/1993 Aritsuka
6,408,275 B1 * 6/2002 Bastin ................ H03M 7/3066 704/211

(Continued)

FOREIGN PATENT DOCUMENTS

AU 2018100318 A4 4/2018
CN 105023580 11/2015

(Continued)

OTHER PUBLICATIONS

Pascual, S., Bonafonte, A., & Serra, J. (2017). SEGAN: Speech enhancement generative adversarial network. arXiv preprint arXiv: 1703.09452.*

(Continued)

*Primary Examiner* — Bryan S Blankenagel

(57) ABSTRACT

Described herein is a method of low-bitrate coding of audio data and generating enhancement metadata for controlling audio enhancement of the low-bitrate coded audio data at a decoder side, including the steps of: (a) core encoding original audio data at a low bitrate to obtain encoded audio data; (b) generating enhancement metadata to be used for controlling a type and/or amount of audio enhancement at the decoder side after core decoding the encoded audio data;

(Continued)

and (c) outputting the encoded audio data and the enhancement metadata. Described is further an encoder configured to perform said method. Described is moreover a method for generating enhanced audio data from low-bitrate coded audio data based on enhancement metadata and a decoder configured to perform said method.

27 Claims, 9 Drawing Sheets

(56) References Cited

U.S. PATENT DOCUMENTS

| | | | | |
|---|---|---|---|---|
| 6,876,966 | B1 | 4/2005 | Deng | |
| 7,072,366 | B2 | 7/2006 | Parkkinen | |
| 7,337,025 | B1 | 2/2008 | Absar | |
| 8,069,049 | B2 | 11/2011 | Nilsson | |
| 8,639,519 | B2 | 1/2014 | Ashley | |
| 8,892,428 | B2 | 11/2014 | Oshikiri | |
| 9,263,060 | B2 | 2/2016 | Sharp | |
| 9,622,009 | B2 | 4/2017 | Robinson | |
| 9,823,892 | B2 * | 11/2017 | Maling, III | H04L 12/282 |
| 9,886,949 | B2 | 2/2018 | Li | |
| 10,062,390 | B2 | 8/2018 | Nagel | |
| 10,068,557 | B1 | 9/2018 | Engel | |
| 10,127,918 | B1 | 11/2018 | Kamath Koteshwara | |
| 10,839,809 | B1 * | 11/2020 | Jha | H04L 65/70 |
| 2002/0012429 | A1 | 1/2002 | Matt | |
| 2003/0191634 | A1 * | 10/2003 | Thomas | G10L 19/04<br>704/219 |
| 2004/0252850 | A1 * | 12/2004 | Turicchia | G10L 21/0364<br>704/E21.009 |
| 2007/0081657 | A1 * | 4/2007 | Turner | H04M 19/042<br>379/257 |
| 2008/0027708 | A1 * | 1/2008 | Ramakrishnan | G10L 15/02<br>704/E15.004 |
| 2012/0296658 | A1 | 11/2012 | Smyth | |
| 2016/0065160 | A1 | 3/2016 | Choi | |
| 2016/0191594 | A1 | 6/2016 | Moustafa | |
| 2016/0225387 | A1 * | 8/2016 | Koppens | G10L 19/20 |
| 2017/0092265 | A1 | 3/2017 | Sainath | |
| 2017/0256254 | A1 | 9/2017 | Huang | |
| 2018/0075343 | A1 | 3/2018 | Van Den Oord | |
| 2018/0082679 | A1 | 3/2018 | Mccord | |
| 2018/0190313 | A1 | 7/2018 | Sadri | |
| 2018/0247636 | A1 | 8/2018 | Arik | |
| 2018/0286425 | A1 | 10/2018 | Baek | |
| 2018/0288420 | A1 | 10/2018 | Yu | |
| 2018/0366138 | A1 | 12/2018 | Ramprashad | |
| 2019/0034791 | A1 | 1/2019 | Busch | |
| 2019/0057694 | A1 | 2/2019 | Biswas | |
| 2019/0103118 | A1 * | 4/2019 | Atti | G10L 19/008 |
| 2019/0104357 | A1 | 4/2019 | Atkins | |
| 2020/0118004 | A1 * | 4/2020 | Chen | G06F 9/223 |
| 2020/0342879 | A1 * | 10/2020 | Carbune | G10L 17/04 |
| 2021/0166705 | A1 * | 6/2021 | Chang | G10L 21/038 |

FOREIGN PATENT DOCUMENTS

| | | | |
|---|---|---|---|
| EP | 1104096 | A2 | 5/2001 |
| JP | 2008505586 | A | 2/2008 |
| WO | 2018199987 | | 11/2018 |

OTHER PUBLICATIONS

Aaron Van Den Oord "Wavenet: A Generative Model for Raw Audio" Sep. 2016, pp. 1-15.

Annadana, R. et al."A Novel Audio Post-Processing Toolkit for the Enhancement of Audio Signals Coded at Low Bit Rates" presented at the 123rd Convention, Oct. 5-8, 2007, New York, USA.

Huang, Q. et al"Bandwidth Extension Method Based on Generative Adversarial Nets for Audio Compression" AES presented at the 144th Convention, May 23-26, 2018, Milan, Italy.

Lapierre, J. et al."Pre-Echo Noise Reduction in Frequency-Domain Audio Codecs" ICASSP 2017, pp. 686-690.

Li, S. et al."Speech Bandwidth Extension Using Generative Adversarial Networks" IEEE Apr. 2018, pp. 5029-5033.

Liu, D. et al."Experiments on Deep Learning for Speech Denoising" Interspeech, Sep. 14-18, 2014, Singapore, pp. 2685-2689.

Michelsanti, D. et al. "Conditional Generative Adversarial Networks for Speech Enhancement and Noise-Robust Speaker Verification" Interspeech Aug. 20-24, 2017, Stockholm, Sweden, pp. 2008-2011.

Rethage, D. et al."A Wavenet for Speech Denoising" IEEE International Conference on Acoustics, Speech and Signal Processing ICASSP, Apr. 15-20, 2018.

Riedmiller, J. et al."Delivering Scalable Audio Experiences Using AC-4" IEEE Transactions on Broadcasting, vol. 63, No. 1, pp. 179-201, Mar. 2017.

* cited by examiner

METHOD AND APPARATUS FOR CONTROLLING ENHANCEMENT OF LOW-BITRATE CODED AUDIO

CROSS-REFERENCE TO RELATED APPLICATIONS

This application claims priority to PCT Application No. PCT/CN2018/103317, filed Aug. 30, 2018, U.S. Provisional Patent Application No. 62/733,409, filed Sep. 19, 2018 and U.S. Provisional Patent Application No. 62/850,117, filed May 20, 2019, each of which is hereby incorporated by reference in its entirety.

TECHNOLOGY

The present disclosure relates generally to a method of low-bitrate coding of audio data and generating enhancement metadata for controlling audio enhancement of the low-bitrate coded audio data at a decoder side, and more specifically to generating enhancement metadata to be used for controlling a type and/or amount of audio enhancement at the decoder side after core decoding the encoded audio data. The present disclosure moreover relates to a respective encoder, a method for generating enhanced audio data from low-bitrate coded audio data based on enhancement metadata and a respective decoder.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

In recent years it has been observed that in particular deep learning approaches can provide breakthrough audio enhancement.

Audio recording systems are used to encode an audio signal into an encoded signal that is suitable for transmission or storage, and then subsequently receive or retrieve and decode the coded signal to obtain a version of the original audio signal for playback. Low-bitrate audio coding is a perceptual audio compression technology which allows to reduce bandwidth and storage requirements. Examples of perceptual audio coding systems include Dolby-AC3, Advanced Audio Coding (AAC), and the more recently standardized Dolby AC-4 audio coding system standardized by ETSI and included in ATSC 3.0.

However, low-bitrate audio coding introduces unavoidable coding artifacts. Audio coded at low bitrates may suffer especially from details in the audio signal and the quality of the audio signal may be degraded due to the noise introduced by quantization and coding. A particular problem in this regard is the so-called pre-echo artifact. A pre-echo artifact is generated in the quantization of transient audio signals in the frequency domain which causes the quantization noise to spread before the transient itself. Pre-echo noise indeed significantly impairs the quality of an audio codec such as for example the MPEG AAC codec, or any other transform-based (e.g. MDCT-based) audio codec.

Up to now, several methods have been developed to reduce pre-echo noise and thus enhance the quality of low-bitrate coded audio. These methods include short block switching and temporal noise shaping (TNS). The latter technique is based on the application of prediction filters in the frequency domain to shape the quantization noise in the time domain to make the noise appear less disturbing to the user.

A recent method to reduce pre-echo noise in frequency-domain audio codecs has been published by J. Lapierre and R. Lefebvre, proceedings of the International Conference on Acoustics, Speech and Signals Processing 2017. This recently developed method is based on an algorithm to operate at the decoder using data from the received bitstream. In particular, the decoded bitstream is tested frame-wise for the presence of a transient signal likely to produce a pre-echo artifact. Upon detecting such a signal, the audio signal is split into a pre-transient and a post-transient signal part which are then fed to the noise reduction algorithm together with specific transient characteristics and the codec parameters. First, an amount of quantization noise present in the frame is then estimated for each frequency band or frequency coefficient using scale factors and coefficient amplitudes from the bitstream. This estimate is then used to shape a random noise signal which is added to the post-signal in the oversampled DFT domain, which is then transformed into the time domain, multiplied by the pre-window and returned to the frequency domain. In this, spectral subtraction can be applied on the pre-signal without adding any artifacts. To further preserve total frame energy, and considering that due to quantization noise the signal is smeared from the post- to the pre-signal, the energy removed from the pre-signal is added back to the post-signal. After adding both signals together and transforming into the MDCT domain, the remainder of the decoder can then use the modified MDCT coefficients in replacement of the original ones. A drawback already identified by the authors is, however, that despite the fact that the algorithm can be used in present-day systems, the computations at the decoder are nevertheless increased.

A novel post-processing toolkit for the enhancement of audio signals coded at low bitrates has been published by A. Raghuram et al. in convention paper 7221 of the Audio Engineering Society presented at the 123$^{rd}$ Convention in New York, NY, USA, Oct. 5-8, 2007. Amongst others, the paper also addresses the problem of noise in low-bitrate coded audio and presents an Automatic Noise Removal (ANR) algorithm to remove wide-band background noise based on adaptive filtering techniques. In particular, one aspect of the ANR algorithm is that by performing a detailed harmonic analysis of the signal and by utilizing perceptual modelling and accurate signal analysis and synthesis, the primary signal sound can be preserved as the primary signal components from the signal are removed prior to the step of noise removal. A second aspect of the ANR algorithm is that it continuously and automatically updates noise profile/statistics with the help of a novel signal activity detection algorithm making the noise removal process fully automatic. The noise removal algorithm uses as a core a de-noising Kalman filter.

Besides the pre-echo artifact, the quality of low-bitrate coded audio is also impaired by quantization noise. In order to reduce information capacity requirements, the spectral components of the audio signal are quantized. Quantization, however, injects noise into the signal. Generally, perceptual audio coding systems involve the use of psychoacoustic models to control the amplitude of quantization noise so that it is masked or rendered inaudible by spectral components in the signal.

Spectral components within a given band are often quantized to the same quantizing resolution and according to the psychoacoustic model the smallest signal to noise ratio (SNR) concomitant with the largest minimum quantization resolution is determined that is possible without injecting an audible level of quantization noise. For wider bands information capacity requirements constrain the coding system to a relatively coarse quantization resolution. As a result, smaller-valued spectral components are quantized to zero if they have a magnitude that is less than the minimum quantizing level. The existence of many quantized-to-zero spectral components (spectral holes) in an encoded signal can degrade the quality of the audio signal even if the quantization noise is kept low enough to be inaudible or psychoacoustically masked. Degradation in this regard may result from the quantization noise not being inaudible as the result from the psychoacoustic masking is less then what is predicted by the model used to determine the quantization resolution. Many quantized-to-zero spectral components can moreover audibly reduce the energy or power of the decoded audio signal as compared to the original audio signal. For coding systems using distortion cancellation filterbanks, the ability of the synthesis filterbank in the decoding process to cancel the distortion can be impaired significantly if the values of one or more spectral components are changed significantly in the encoding process which also impairs the quality of the decoded audio signal.

Companding is a new coding tool in the Dolby AC-4 coding system, which improves perceptual coding of speech and dense transient events (e.g. applause). Benefits of companding include reducing short-time dynamics of an input signal to thus reduce bit rate demands at the encoder side, while at the same time ensuring proper temporal noise shaping at the decoder side.

During the last years, deep learning approaches have become more and more attractive in various fields of application including speech enhancement. In this context, D. Michelsanti and Z. -H. Tan describe in their publication on "Conditional Generative Adversarial Networks for Speech Enhancement and Noise-Robust Speaker Verification", published in INTERSPEECH 2017, that the conditional Generative Adversarial Network (GAN) method outperforms the classical short-time spectral amplitude minimum mean square error speech enhancement algorithm and is comparable to a deep neural network-based approach to speech enhancement.

But this outstanding performance may also cause a dilemma: listeners may prefer the deep learning-based enhanced version of the original audio over the original audio, which might not be the artistic intent of the content creator. It would thus be desirable to provide control measures to a content creator at the encoder side allowing the creator to choose whether, how much, or what type of enhancement may be applied at the decoder side, and for which cases. This would give the content creator ultimate control over intent and quality of the enhanced audio.

SUMMARY

In accordance with a first aspect of the present disclosure there is provided a method of low-bitrate coding of audio data and generating enhancement metadata for controlling audio enhancement of the low-bitrate coded audio data at a decoder side. The method may include the step of (a) core encoding original audio data at a low bitrate to obtain encoded audio data. The method may further include the step of (b) generating enhancement metadata to be used for controlling a type and/or amount of audio enhancement at the decoder side after core decoding the encoded audio data. And the method may include the step of (c) outputting the encoded audio data and the enhancement metadata.

In some embodiments, generating enhancement metadata in step (b) may include:

(i) core decoding the encoded audio data to obtain core decoded raw audio data;

(ii) inputting the core decoded raw audio data into an audio enhancer for processing the core decoded raw audio data based on candidate enhancement metadata for controlling the type and/or amount of audio enhancement of audio data that is input to the audio enhancer;

(iii) obtaining, as an output from the audio enhancer, enhanced audio data;

(iv) determining a suitability of the candidate enhancement metadata based on the enhanced audio data; and (v) generating enhancement metadata based on a result of the determination.

In some embodiments, determining the suitability of the candidate enhancement metadata in step (iv) may include presenting the enhanced audio data to a user and receiving a first input from the user in response to the presenting, and wherein in step (v) generating the enhancement metadata may be based on the first input.

In some embodiments, the first input from the user may include an indication of whether the candidate enhancement metadata are accepted or declined by the user.

In some embodiments, in case of the user declining the candidate enhancement metadata, a second input indicating a modification of the candidate enhancement metadata may be received from the user and generating the enhancement metadata in step (v) may be based on the second input.

In some embodiments, in case of the user declining the candidate enhancement metadata, steps (ii) to (v) may be repeated.

In some embodiments, the enhancement metadata may include one or more items of enhancement control data.

In some embodiments, the enhancement control data may include information on one or more types of audio enhancement, the one or more types of audio enhancement including one or more of speech enhancement, music enhancement and applause enhancement.

In some embodiments, the enhancement control data may further include information on respective allowabilities of the one or more types of audio enhancement.

In some embodiments, the enhancement control data may further include information on an amount of audio enhancement.

In some embodiments, the enhancement control data may further include information on an allowability as to whether audio enhancement is to be performed by an automatically updated audio enhancer at the decoder side.

In some embodiments, processing the core decoded raw audio data based on the candidate enhancement metadata in step (ii) may be performed by applying one or more predefined audio enhancement modules, and the enhancement control data may further include information on an allowability of using one or more different enhancement modules at decoder side that achieve the same or substantially the same type of enhancement.

In some embodiments, the audio enhancer may be a Generator.

In accordance with a second aspect of the present disclosure there is provided an encoder for generating enhancement metadata for controlling enhancement of low-bitrate coded audio data. The encoder may include one or more processors configured to perform a method of low-bitrate coding of audio data and generating enhancement metadata for controlling audio enhancement of the low-bitrate coded audio data at a decoder side.

In accordance with a third aspect of the present disclosure there is provided a method for generating enhanced audio data from low-bitrate coded audio data based on enhancement metadata. The method may include the step of (a) receiving audio data encoded at a low bitrate and enhancement metadata. The method may further include the step of (b) core decoding the encoded audio data to obtain core decoded raw audio data. The method may further include the step of (c) inputting the core decoded raw audio data into an audio enhancer for processing the core decoded raw audio data based on the enhancement metadata. The method may further include the step of (d) obtaining, as an output from the audio enhancer, enhanced audio data. And the method may include the step of (e) outputting the enhanced audio data.

In some embodiments, processing the core decoded raw audio data based on the enhancement metadata may be performed by applying one or more audio enhancement modules in accordance with the enhancement metadata.

In some embodiments, the audio enhancer may be a Generator.

In accordance with a fourth aspect of the present disclosure there is provided a decoder for generating enhanced audio data from low-bitrate coded audio data based on enhancement metadata. The decoder may include one or more processors configured to perform a method for generating enhanced audio data from low-bitrate coded audio data based on enhancement metadata.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Overview on Audio Enhancement

Figure 1:
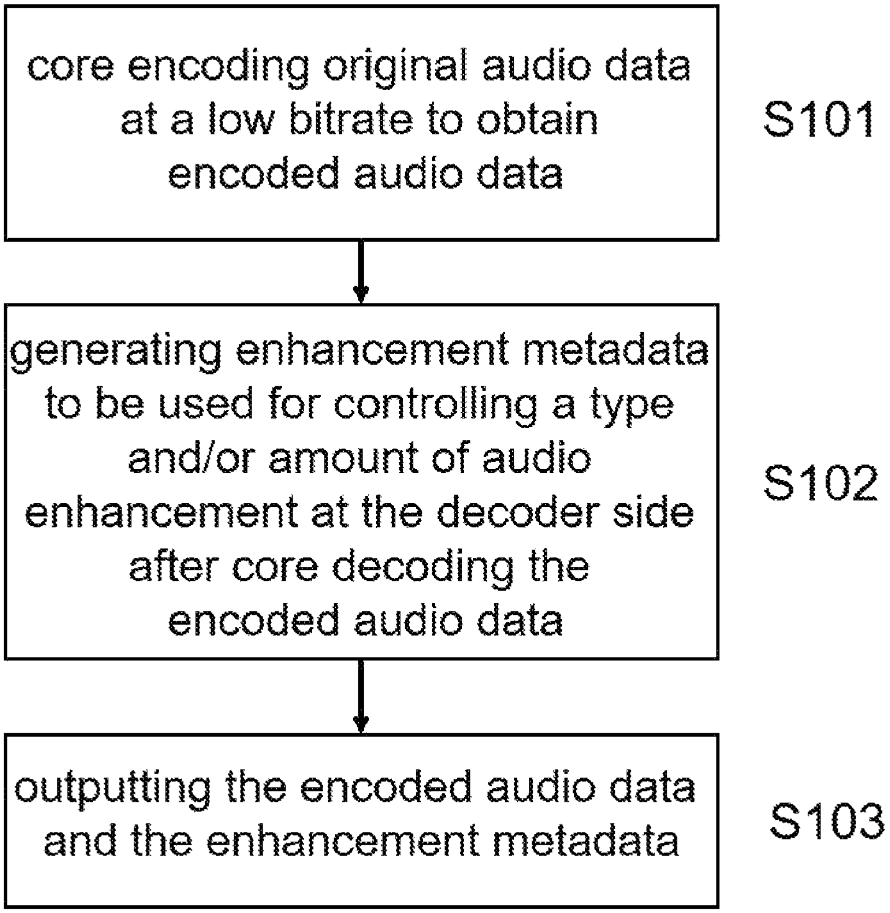
FIG. 1 illustrates a flow diagram of an example of a method of low-bitrate coding of audio data and generating enhancement metadata for controlling audio enhancement of the low-bitrate coded audio data at a decoder side.

Generating enhanced audio data from a low-bitrate coded audio bitstream at decoding side may, for example, be performed as given in the following and described in 62/733,409 which is incorporated herein by reference in its entirety. A low-bitrate coded audio bitstream of any codec used in lossy audio compression, for example, AAC (Advanced Audio Coding), Dolby-AC3, HE-AAC, USAC or Dolby-AC4 may be received. Decoded raw audio data obtained from the received and decoded low-bitrate coded audio bitstream may be input into a Generator for enhancing the raw audio data. The raw audio data may then be enhanced by the Generator. An enhancement process in general is intended to enhance the quality of the raw audio data by reducing coding artifacts. Enhancing raw audio data by the Generator may thus include one or more of reducing pre-echo noise, quantization noise, filling spectral gaps and computing the conditioning of one or more missing frames. The term spectral gaps may include both spectral holes and missing high frequency bandwidth. The conditioning of one or more missing frames may be computed using user-generated parameters. As an output from the Generator, enhanced audio data may then be obtained.

The above described method of performing audio enhancement may be performed in the time domain and/or at least partly in the intermediate (codec) transform-domain. For example, the raw audio data may be transformed to the intermediate transform-domain before inputting the raw audio data into the Generator and the obtained enhanced audio data may be transformed back to the time-domain. The intermediate transform-domain may be, for example, the MDCT domain.

Audio enhancement may be implemented on any decoder either in the time-domain or in the intermediate (codec) transform-domain. Alternatively, or additionally, audio enhancement may also be guided by encoder generated metadata. Encoder generated metadata in general may include one or more of encoder parameters and/or bitstream parameters.

Audio enhancement may also be performed, for example, by a system of a decoder for generating enhanced audio data from a low-bitrate coded audio bitstream and a Generative Adversarial Network setting comprising a Generator and a Discriminator.

As already mentioned above, audio enhancement by a decoder may be guided by encoder generated metadata. Encoder generated metadata may, for example, include an indication of an encoding quality. The indication of an encoding quality may include, for example, information on the presence and impact of coding artifacts on the quality of the decoded audio data as compared to the original audio data. The indication of the encoding quality may thus be used to guide the enhancement of raw audio data in a Generator. The indication of the encoding quality may also be used as additional information in a coded audio feature space (also known as bottleneck layer) of the Generator to modify audio data.

Metadata may, for example, also include bitstream parameters. Bitstream parameters may, for example, include one or more of a bitrate, scale factor values related to AAC-based codecs and Dolby AC-4 codec, and Global Gain related to AAC-based codecs and Dolby AC-4 codec. Bitstream parameters may be used to guide enhancement of raw audio data in a Generator. Bitstream parameters may also be used as additional information in a coded audio feature space of the Generator.

Metadata may, for example, further also include an indication on whether to enhance decoded raw audio data by a Generator. This information may thus be used as a trigger for audio enhancement. If the indication would be YES, then enhancement may be performed. If the indication would be NO, then enhancement may be circumvented by a decoder and a decoding process as conventionally performed on the decoder may be performed based on the received bitstream including the metadata.

Generative Adversarial Network Setting

As stated above, a Generator may be used at decoding side to enhance raw audio data to reduce coding artifacts introduced by low-bitrate coding and to thus enhance the quality of raw audio data as compared to the original uncoded audio data.

Such a Generator may be a Generator trained in a Generative Adversarial Network setting (GAN setting). A GAN setting generally includes the Generator G and a Discriminator D which are trained by an iterative process. During training in the Generative Adversarial Network setting, the Generator G generates enhanced audio data, x*, based on a random noise vector, z, and raw audio data derived from original audio data, x, that has been coded at a low bitrate and decoded, respectively. The random noise vector may, however, be set to z=0, which was found to be best for coding artifact reduction. Training may be performed without the input of a random noise vector, z. In addition, metadata may be input into the Generator for modifying enhanced audio data in a coded audio feature space. In this, during training, the generation of enhanced audio data may be conditioned based on the metadata. The Generator G tries to output enhanced audio data, x*, that is indistinguishable from the original audio data, x. The Discriminator D is one at a time fed with the generated enhanced audio data, x*, and the original audio data, x, and judges in a fake/real manner whether the input data are enhanced audio data, x*, or original audio data, x. In this, the Discriminator D tries to discriminate the original audio data, x, from the enhanced audio data, x*. During the iterative process, the Generator G then tunes its parameters to generate better and better enhanced audio data, x*, as compared to the original audio data, x, and the Discriminator D learns to better judge between the enhanced audio data, x*, and the original audio data, x. This adversarial learning process may be described by the following equation (1):

$$\min_G \max_D V(D, G) = \mathbb{E}_{x \sim p_{data}(x)}[\log D(x)] + \mathbb{E}_{z \sim p_z(z)}[\log(1 - D(G(z)))] \quad (1)$$

It shall be noted that the Discriminator D may be trained first in order to train the Generator G in a final step. Training and updating the Discriminator D may involve maximizing the probability of assigning high scores to original audio data, x, and low scores to enhanced audio data, x*. The goal in training of the Discriminator D may be that original audio data (uncoded) is recognized as real while enhanced audio data, x* (generated), is recognized as fake. While the Discriminator D is trained and updated, the parameters of the Generator G may be kept fix.

Training and updating the Generator G may then involve minimizing the difference between the original audio data, x, and the generated enhanced audio data, x*. The goal in training the Generator G may be to achieve that the Discriminator D recognizes generated enhanced audio data, x*, as real.

Training of a Generator G may, for example, involve the following. Raw audio data, x̃, and a random noise vector, z, may be input into the Generator G. The raw audio data, x̃, may be obtained from coding at a low bitrate and subsequently decoding original audio data, x. Based on the input, the Generator G may then generate enhanced audio data, x*. If a random noise vector, z, is used, it may be set to z=0 or training may be performed without the input of a random noise vector, z. Additionally, the Generator G may be trained using metadata as input in a coded audio feature space to modify the enhanced audio data, x*. One at a time, the original data, x, from which the raw audio data, x̃, has been derived, and the generated enhanced audio data, x*, are then input into a Discriminator D. As additional information, also the raw audio data, x̃, may be input each time into the Discriminator D. The Discriminator D may then judge whether the input data is enhanced audio data, x*(fake), or original data, x (real). In a next step, the parameters of the Generator G may then be tuned until the Discriminator D can no longer distinguish the enhanced audio data, x*, from the original data, x. This may be done in an iterative process.

Judging by the Discriminator D may be based on one or more of a perceptually motivated objective function as according to the following equation (2):

$$\min_G V_{LS\text{-}GAN}(G) = \frac{1}{2}\mathbb{E}_{z \sim p_z(z), \tilde{x} \sim p_{data}(\tilde{x})}[(D(x^*, \tilde{x}) - 1)^2] + \lambda \|x^* - x\|_1 \quad (2)$$

The index LS refers to the incorporation of a least squares approach. In addition, as can be seen from the first term in equation (2), a conditioned Generative Adversarial Network setting has been applied by inputting the raw audio data, x̃, as additional information into the Discriminator.

It was, however, found that especially with the introduction of the last term in the above equation (2), it can be ensured during the iterative process that lower frequencies are not disrupted as these frequencies are typically coded with a higher number of bits. The last term is a 1-norm distance scaled by the factor lambda λ. The value of lambda may be chosen of from 10 to 100 depending on the application and/or signal length that is input into the Generator. For example, lambda may be chosen to be λ=100.

Training of a Discriminator D may follow the same general process as described above for the training of a Generator G, except that in this case the parameters of the Generator G may be fixed while the parameters of the Discriminator D may be varied. The training of a Discriminator D may, for example, be described by the following equation (3) that enables the Discriminator D to determine enhanced audio data, x*, as fake:

$$\min_D V_{LS\text{-}GAN}(D) = \quad (3)$$

-continued $$\frac{1}{2}\mathbb{E}_{x,\tilde{x}\sim p_{data}(x,\tilde{x})}[(D(x,\tilde{x})-1)^2]+\frac{1}{2}\mathbb{E}_{z\sim p_z(z),\tilde{x}\sim p_{data}(\tilde{x})}[D(x^*,\tilde{x})^2]$$

In the above case, also the least squares approach (LS) and a conditioned Generative Adversarial Network setting has been applied by inputting raw audio data, x̃, as additional information into the Discriminator.

Besides the least squares approach, also other training methods may be used for training a Generator and a Discriminator in a Generative Adversarial Network setting. For example, the so-called Wasserstein approach may be used. In this case, instead of the least squares distance the Earth Mover Distance also known as Wasserstein Distance may be used. In general, different training methods make the training of a Generator and a Discriminator more stable. The kind of training method applied, does, however, not impact the architecture of a Generator which is exemplarily detailed below.

Architecture of a Generator

While the architecture of a Generator is generally not limited, a Generator may, for example, include an encoder stage and a decoder stage. The encoder stage and the decoder stage of the Generator may be fully convolutional. The decoder stage may mirror the encoder stage and the encoder stage as well as the decoder may each include a number of L layers with a number of N filters in each layer L. L may be a natural number ≥1 and N may be a natural number ≥1. The size (also known as kernel size) of the N filters is not limited and may be chosen according to the requirements of the enhancement of the quality of the raw audio data by the Generator. The filter size may, however, be the same in each of the L layers.

In more detail, the Generator may have a first encoder layer, layer number L=1, which may include N=16 filters having a filter size of 31. A second encoder layer, layer number L=2, may include N=32 filters having a filter size of 31. A subsequent encoder layer, layer number L=11, may include N=512 filters having a filter size of 31. In each layer the number of filters thus increases. Each of the filters may operate on the audio data input into each of encoder the layers with a stride of 2. In this, the depth gets larger as the width (duration of signal in time) gets narrower. Thus, a learnable down-sampling by a factor of 2 may be performed. Alternatively, the filters may operate with a stride of 1 in each of the encoder layers followed by a down-sampling by a factor of 2 (as in known signal processing).

In at least one encoder layer and in at least one decoder layer, a non-linear operation may be performed in addition as an activation. The non-linear operation may, for example, include one or more of a parametric rectified linear unit (PReLU), a rectified linear unit (ReLU), a leaky rectified linear unit (LReLU), an exponential linear unit (eLU) and a scaled exponential linear unit (SeLU).

Respective decoder layers may mirror the encoder layers. While the number of filters in each layer and the filter widths in each layer may be the same in the decoder stage as in the encoder stage, up-sampling of the audio signal starting from the narrow widths (duration of signal in time) may be performed by two alternative approaches. Fractionally-strided convolution (also known as transposed convolution) operations may be used in the layers of the decoder stage to increase the width of the audio signal to the full duration, i.e. the frame of the audio signal that was input into the Generator.

Alternatively, in each layer of the decoder stage the filters may operate on the audio data input into each layer with a stride of 1, after up-sampling and interpolation is performed as in conventional signal processing with the up-sampling factor of 2.

In addition, an output layer (convolution layer) may then follow the decoder stage before the enhanced audio data may be output in a final step. The output layer may, for example, include N=1 filters having a filter size of 31.

In the output layer, the activation may be different to the activation performed in the at least one of the encoder layers and the at least one of the decoder layers. The activation may be any non-linear function that is bounded to the same range as the audio signal that is input into the Generator. A time signal to be enhanced may be bounded for example between +/−1. The activation may then be based, for example, on a tanh operation.

In between the encoder stage and the decoder stage, audio data may be modified to generate enhanced audio data. The modification may be based on a coded audio feature space (also known as bottleneck layer). The modification in the coded audio feature space may be done for example by concatenating a random noise vector (z) with the vector representation (c) of the raw audio data as output from the last layer in the encoder stage. The random noise vector may, however, be set to z=0. It was found that for coding artifact reduction setting the random noise vector to z=0 may yield the best results. As additional information, bitstream parameters and encoder parameters included in metadata may be input at this point to modify the enhanced audio data. In this, generation of the enhanced audio data may be conditioned based on given metadata.

Skip connections may exist between homologues layers of the encoder stage and the decoder stage. In this, the enhanced audio may maintain the time structure or texture of the coded audio as the coded audio feature space described above may thus be bypassed preventing loss of information. Skip connections may be implemented using one or more of concatenation and signal addition. Due to the implementation of skip connections, the number of filter outputs may be "virtually" doubled.

The architecture of the Generator may, for example, be summarized as follows (skip connections omitted):

input: raw audio data encoder layer L=1: filter number N=16, filter size=31, activation=PreLU encoder layer L=2: filter number N=32, filter size=31, activation=PreLU encoder layer L=11: filter number N=512, filter size=31 encoder layer L=12: filter number N=1024, filter size=31 coded audio feature space decoder layer L=1: filter number N=512, filter size=31 decoder layer L=10: filter number N=32, filter size=31, activation PreLU decoder layer L=11: filter number N=16, filter size=31, activation PreLU output layer: filter number N=1, filter size=31, activation tanh output enhanced audio data Depending on the application, the number of layers in the encoder stage and in the decoder stage of the Generator may, however, be down-scaled or up-scaled, respectively.

Architecture of a Discriminator

The architecture of a Discriminator may follow the same one-dimensional convolutional structure as the encoder stage of the Generator exemplarily described above. The Discriminator architecture may thus mirror the decoder stage of the Generator. The Discriminator may thus include a number of L layers, wherein each layer may include a number of N filters. L may be a natural number ≥1 and N may be a natural number ≥1. The size of the N filters is not limited and may also be chosen according to the requirements of the Discriminator. The filter size may, however, be the same in each of the L layers. A non-linear operation performed in at least one of the encoder layers of the Discriminator may include Leaky ReLU.

Following the encoder stage, the Discriminator may include an output layer. The output layer may have N=1 filters having a filter size of 1. In this, the filter size of the output layer may be different from the filter size of the encoder layers. The output layer is thus a one-dimensional convolution layer that does not down-sample hidden activations. This means that the filter in the output layer may operate with a stride of 1 while all previous layers of the encoder stage of the Discriminator may use a stride of 2. The activation in the output layer may be different from the activation in the at least one of the encoder layers. The activation may be sigmoid. However, if a least squares training approach is used, sigmoid activation may not be required and is therefore optional.

The architecture of a Discriminator may be exemplarily summarized as follows:

input enhanced audio data or original audio data encoder layer L=1: filter number N=16, filter size=31, activation=Leaky ReLU encoder layer L=2: filter number N=32, filter size=31, activation=Leaky ReLU encoder layer L=11: filter number N=1024, filter size=31, activation=Leaky ReLU output layer: filter number N=1, filter size=1, optionally: activation=sigmoid output (not shown): judgement on the input as real/fake in relation to original data and enhanced audio data generated by a Generator.

Depending on the application, the number of layers in the encoder stage of the Discriminator may, for example, be down-scaled or up-scaled, respectively.

Companding

Companding techniques, as described in U.S. Pat. No. 9,947,335 B2, which is incorporated herein by reference in its entirety, achieve temporal noise shaping of quantization noise in an audio codec through use of a companding algorithm implemented in the QMF (quadrature mirror filter) domain to achieve temporal shaping of quantization noise. In general, companding is a parametric coding tool that operates in the QMF domain that may be used for controlling the temporal distribution of quantization noise (e.g., quantization noise introduced in the MDCT (modified discrete cosine transform) domain) As such, companding techniques may involve a QMF analysis step, followed by application of the actual companding operation/algorithm, and a QMF synthesis step.

Companding may be seen as an example technique that reduces the dynamic range of a signal, and equivalently, that removes a temporal envelope from the signal. Improvements of the quality of audio in a reduced dynamic range domain may be in particular valuable for application with companding techniques.

Audio enhancement of audio data in a dynamic range reduced domain from a low-bitrate audio bitstream may, for example, be performed as detailed in the following and described in 62/850,117 which is incorporated herein by reference in its entirety. A low-bitrate audio bitstream of any codec used in lossy audio compression, for example AAC (Advanced Audio Coding), Dolby-AC3, HE-AAC, USAC or Dolby-AC4 may be received. However, the low-bitrate audio bitstream may be in AC-4 format. The low-bitrate audio bitstream may be core decoded and dynamic range reduced raw audio data may be obtained based on the low-bitrate audio bitstream. For example, the low-bitrate audio bitstream may be core decoded to obtain dynamic range reduced raw audio data based on the low-bitrate audio bitstream. Dynamic range reduced audio data may be encoded in the low bitrate audio bitstream. Alternatively, dynamic range reduction may be performed prior to or after core decoding the low-bitrate audio bitstream. The dynamic range reduced raw audio data may be input into a Generator for processing the dynamic range reduced raw audio data. The dynamic range reduced raw audio data may then be enhanced by the Generator in the dynamic range reduced domain. The enhancement process performed by the Generator is intended to enhance the quality of the raw audio data by reducing coding artifacts and quantization noise. As an output, enhanced dynamic range reduced audio data may be obtained for subsequent expansion to an expanded domain. Such a method may further include expanding the enhanced dynamic range reduced audio data to the expanded dynamic range domain by performing an expansion operation. An expansion operation may be a companding operation based on a p-norm of spectral magnitudes for calculating respective gain values.

In companding (compression/expansion) in general, gain values for compression and expansion are calculated and applied in a filter-bank. A short prototype filter may be applied to resolve potential issues associated with the application of individual gain values. Referring to the above companding operation, the enhanced dynamic range reduced audio data as output by the Generator may be analyzed by a filter-bank and a wideband gain may be applied directly in the frequency domain. According to the shape of the prototype filter applied, the corresponding effect in time domain is to naturally smooth the gain application. The modified frequency signal is then converted back to the time domain in the respective synthesis filter bank. Analyzing a signal with a filter bank provides access to its spectral content, and allows the calculation of gains that preferentially boost the contribution due to the high frequencies, (or to boost contribution due to any spectral content that is weak), providing gain values that are not dominated by the strongest components in the signal, thus resolving problems associated with audio sources that comprise a mixture of different sources. In this context, the gain values may be calculated using a p-norm of the spectral magnitudes where p is typically less than 2, which has been found to be more effective in shaping quantization noise, than basing on energy as for p=2.

The above described method may be implemented on any decoder. If the above method is applied in conjunction with companding, the above described method may be implemented on an AC-4 decoder.

Alternatively, or additionally, the above method may also be performed by a system of an apparatus for generating, in a dynamic range reduced domain, enhanced audio data from a low-bitrate audio bitstream and a Generative Adversarial Network setting comprising a Generator and a Discriminator. The apparatus may be a decoder.

The above method may also be carried out by an apparatus for generating, in a dynamic range reduced domain, enhanced audio data from a low-bitrate audio bitstream, wherein the apparatus may include a receiver for receiving the low-bitrate audio bitstream; a core decoder for core decoding the received low-bitrate audio bitstream to obtain dynamic range reduced raw audio data based on the low-bitrate audio bitstream; and a Generator for enhancing the dynamic range reduced raw audio data in the dynamic range reduced domain. The apparatus may further include a demultiplexer. The apparatus may further include an expansion unit.

Alternatively, or additionally, the apparatus may be part of a system of an apparatus for applying dynamic range reduction to input audio data and encoding the dynamic range reduced audio data in a bitstream at a low bitrate and said apparatus.

Alternatively, or additionally, the above method may be implemented by a respective computer program product comprising a computer-readable storage medium with instructions adapted to cause a device to carry out the above method when executed on a device having processing capability.

Alternatively, or additionally, the above method may involve metadata. A received low-bitrate audio bitstream may include metadata and the method may further include demultiplexing the received low-bitrate audio bitstream. Enhancing the dynamic range reduced raw audio data by a Generator may then be based on the metadata. If applied in conjunction with companding, the metadata may include one or more items of companding control data. Companding in general may provide benefit for speech and transient signals, while degrading the quality of some stationary signals as modifying each QMF time slot individually with a gain value may result in discontinuities during encoding that, at the companding decoder, may result in discontinuities in the envelope of the shaped noise leading to audible artifacts. By respective companding control data, it is possible to selectively switch companding on for transient signals and off for stationary signals or to apply average companding where appropriate. Average companding, in this context, refers to the application of a constant gain to an audio frame resembling the gains of adjacent active companding frames. The companding control data may be detected during encoding and transmitted via the low-bitrate audio bitstream to the decoder. Companding control data may include information on a companding mode among one or more companding modes that had been used for encoding the audio data. A companding mode may include the companding mode of companding on, the companding mode of companding off and the companding mode of average companding. Enhancing dynamic range reduced raw audio data by a Generator may depend on the companding mode indicated in the companding control data. If the companding mode is companding off, enhancing by a Generator may not be performed.

Generative Adversarial Network Setting in the Reduced Dynamic Range Domain

A Generator may also enhance dynamic range reduced raw audio data in the reduced dynamic range domain. By the enhancement, coding artifacts introduced by low-bitrate coding are reduced and the quality of dynamic range reduced raw audio data as compared to original uncoded dynamic range reduced audio data is thus enhanced already prior to expansion of the dynamic range.

The Generator may therefore be a Generator trained in a dynamic range reduced domain in a Generative Adversarial Network setting (GAN setting). The dynamic range reduced domain may be an AC-4 companded domain, for example. In some cases (such as in AC-4 companding), dynamic range reduction may be equivalent to removing (or suppressing) the temporal envelope of the signal. Thus, it may be said that the Generator may be a Generator trained in a domain after removing the temporal envelope from the signal. Moreover, while in the following a GAN setting will described, it is noted that this is not to be understood in a limiting sense and that also other generative models are conceivable.

As already described above, a GAN setting generally includes a Generator G and a Discriminator D which are trained by an iterative process. During training in the Generative Adversarial Network setting, the Generator G generates enhanced dynamic range reduced audio data x* based on raw dynamic range reduced audio data, $\tilde{x}$, (core encoded and core decoded) derived from original dynamic range reduced audio data, x. Dynamic range reduction may be performed by applying a companding operation. The companding operation may be a companding operation as specified for the AC-4 codec and performed in an AC-4 encoder.

Also in this case, a random noise vector, z, may be input into the Generator in addition to the dynamic range reduced raw audio data, $\tilde{x}$, and generating, by the Generator, the enhanced dynamic range reduced audio data, x*, may be based additionally on the random noise vector, z. The random noise vector may, however, be set to z=0 as it was found that for coding artifact reduction setting the random noise vector to z=0 may be best, especially for not too low bitrates. Alternatively, training may be performed without the input of a random noise vector z. Alternatively, or additionally, metadata may be input into the Generator and enhancing the dynamic range reduced raw audio data, $\tilde{x}$, may be based additionally on the metadata. During training, the generation of enhanced dynamic range reduced audio data, x*, may thus be conditioned based on metadata. The metadata may include one or more items of companding control data. The companding control data may include information on a companding mode among one or more companding modes used for encoding audio data. The companding modes may include the companding mode of companding on, the companding mode of companding off and the companding mode of average companding. Generating, by the Generator, enhanced dynamic range reduced audio data may depend on the companding mode indicated by the companding control data. In this, during training, the Generator may be conditioned on the companding modes. If the companding mode is companding off, this may indicate that the input raw audio data are not dynamic range reduced and enhancing by the Generator may not be performed in this case. As stated above, companding control data may be detected during encoding of audio data and enable to selectively apply companding in that companding is switched on for transient signals, switched off for stationary signals and average companding is applied where appropriate.

During training, the Generator tries to output enhanced dynamic range reduced audio data, x*, that is indistinguishable from the original dynamic range reduced audio data, x. A Discriminator is one at a time fed with the generated enhanced dynamic range reduced audio data, x*, and the original dynamic range reduced data, x, and judges in a fake/real manner whether the input data are enhanced dynamic range reduced audio data, x*, or original dynamic range reduced data, x. In this, the Discriminator tries to discriminate the original dynamic range reduced data, x, from the enhanced dynamic range reduced audio data, x*. During the iterative process, the Generator then tunes its parameters to generate better and better enhanced dynamic range reduced audio data, x*, as compared to the original dynamic range reduced audio data, x, and the Discriminator learns to better judge between the enhanced dynamic range reduced audio data, x*, and the original dynamic range reduced data, x.

It shall be noted that a Discriminator may be trained first in order to train a Generator in a final step. Training and updating of a Discriminator may also be performed in the dynamic range reduced domain. Training and updating a Discriminator may involve maximizing the probability of assigning high scores to original dynamic range reduced audio data, x, and low scores to enhanced dynamic range reduced audio data, x*. The goal in training of a Discriminator may be that original dynamic range reduced audio data, x, is recognized as real while enhanced dynamic range reduced audio data, x*, (generated data) is recognized as fake. While a Discriminator is trained and updated, the parameters of a Generator may be kept fix.

Training and updating a Generator may involve minimizing the difference between the original dynamic range reduced audio data, x, and the generated enhanced dynamic range reduced audio data, x*. The goal in training a Generator may be to achieve that a Discriminator recognizes generated enhanced dynamic range reduced audio data, x*, as real.

In detail, training of a Generator G in the dynamic range reduced domain in a Generative Adversarial Network setting may, for example, involve the following.

Original audio data, $x_{ip}$, may be subjected to dynamic range reduction to obtain dynamic range reduced original audio data, x. The dynamic range reduction may be performed by applying a companding operation, in particular, an AC-4 companding operation followed by a QMF (quadrature mirror filter) synthesis step. As the companding operation is performed in the QMF-domain, the subsequent QMF synthesis step is required. Before inputting into the Generator G the dynamic range reduced original audio data, x, may be subjected in addition to core encoding and core decoding to obtain dynamic range reduced raw audio data, x̃. The dynamic range reduced raw audio data, x̃, and a random noise vector, z, are then input into the Generator G. Based on the input, the Generator G then generates in the dynamic range reduced domain the enhanced dynamic range reduced audio data, x*. The random noise vector, z, may be set to z=0. Alternatively, training may be performed without the input of a random noise vector, z. Alternatively, or additionally, the Generator G may be trained using metadata as input in a dynamic range reduced coded audio feature space to modify the enhanced dynamic range reduced audio data, x*. One at a time, the original dynamic range reduced data, x, from which the dynamic range reduced raw audio data, x̃, has been derived, and the generated enhanced dynamic range reduced audio data, x*, are input into a Discriminator D. As additional information, also the dynamic range reduced raw audio data, x̃, may be input each time into the Discriminator D. The Discriminator D then judges whether the input data is enhanced dynamic range reduced audio data, x*(fake) or original dynamic range reduced data, x (real).

In a next step, the parameters of the Generator G are then tuned until the Discriminator D can no longer distinguish the enhanced dynamic range reduced audio data, x*, from the original dynamic range reduced data, x. This may be done in an iterative process.

Judging by the Discriminator may be based on one or more of a perceptually motivated objective function as according to the following equation (1):

$$\min_G V_{LS\text{-}GAN}(G) = \frac{1}{2}\mathbb{E}_{z\sim p_z(z),\tilde{x}\sim p_{data}(\tilde{x})}[(D(x^*, \tilde{x}) - 1)^2] + \lambda\|x^* - x\|_1 \quad (1)$$

The index LS refers to the incorporation of a least squares approach. In addition, as can be seen from the first term in equation (1), a conditioned Generative Adversarial Network setting has been applied by inputting the core decoded dynamic range reduced raw audio data, x̃, as additional information into the Discriminator.

It was, however, have found that especially with the introduction of the last term in the above equation (1), it can be ensured during the iterative process that lower frequencies are not disrupted as these frequencies are typically coded with a higher number of bits. The last term is a 1-norm distance scaled by the factor lambda λ. The value of lambda may be chosen of from 10 to 100 depending on the application and/or signal length that is input into the Generator. For example, lambda may be chosen to be λ=100.

Training of a Discriminator D in the dynamic range reduced domain in a Generative Adversarial Network setting may follow the same general iterative process as described above for the training of a Generator G in response to inputting, one at a time enhanced dynamic range reduced audio data, x*, and original dynamic range reduced audio data, x, together with the dynamic range reduced raw audio data, x̃, into the Discriminator D except that in this case the parameters of the Generator G may be fixed while the parameters of the Discriminator D may be varied. The training of a Discriminator D may be described by the following equation (2) that enables a Discriminator D to determine enhanced dynamic range reduced audio data, x*, as fake:

$$\min_D V_{LS\text{-}GAN}(D) = \frac{1}{2}\mathbb{E}_{x,\tilde{x}\sim p_{data}(x,\tilde{x})}[(D(x, \tilde{x}) - 1)^2] + \frac{1}{2}\mathbb{E}_{z\sim p_z(z),\tilde{x}\sim p_{data}(\tilde{x})}[D(x^*, \tilde{x})^2] \quad (2)$$

In the above case, also the least squares approach (LS) and a conditioned Generative Adversarial Network setting has been applied by inputting the core decoded dynamic range reduced raw audio data, x̃, as additional information into the Discriminator.

Besides the least squares approach, also in this case other training methods may be used for training a Generator and a Discriminator in a Generative Adversarial Network setting in the dynamic range reduced domain. Alternatively, or additionally, for example, the so-called Wasserstein approach may be used. In this case, instead of the least squares distance, the Earth Mover Distance also known as Wasserstein Distance may be used. In general, different training methods make the training of the Generator and the Discriminator more stable. The kind of training method applied, does, however, not impact the architecture of a Generator which is detailed below.

Architecture of a Generator Trained in the Reduced Dynamic Range Domain

A Generator may, for example, include an encoder stage and a decoder stage. The encoder stage and the decoder stage of the Generator may be fully convolutional. The decoder stage may mirror the encoder stage and the encoder stage as well as the decoder may each include a number of L layers with a number of N filters in each layer L. L may be a natural number ≥1 and N may be a natural number ≥1. The size (also known as kernel size) of the N filters is not limited and may be chosen according to the requirements of the enhancement of the quality of the dynamic range reduced raw audio data by the Generator. The filter size may, however, be the same in each of the L layers.

Dynamic range reduced raw audio data may be input into the Generator in a first step. A first encoder layer, layer number L=1, may include N=16 filters having a filter size of 31. A second encoder layer, layer number L=2, may include N=32 filters having a filter size of 31. A subsequent encoder layer, layer number L=11, may include N=512 filters having a filter size of 31. In each layer the number of filters may thus increase. Each of the filters may operate on the dynamic range reduced audio data input into each of the encoder layers with a stride of >1. Each of the filters may, for example, operate on the dynamic range reduced audio data input into each of the encoder layers with a stride of 2. Thus, a learnable down-sampling by a factor of 2 may be performed. Alternatively, the filters may also operate with a stride of 1 in each of the encoder layers followed by a down-sampling by a factor of 2 (as in known signal processing). Alternatively, for example, each of the filters may operate on the dynamic range reduced audio data input into each of the encoder layers with a stride of 4. This may enable to half the overall number of layers in the Generator.

In at least one encoder layer and in at least one decoder layer of the Generator, a non-linear operation may be performed in addition as an activation. The non-linear operation may include one or more of a parametric rectified linear unit (PReLU), a rectified linear unit (ReLU), a leaky rectified linear unit (LReLU), an exponential linear unit (eLU) and a scaled exponential linear unit (SeLU).

Respective decoder layers may mirror the encoder layers. While the number of filters in each layer and the filter widths in each layer may be the same in the decoder stage as in the encoder stage, up-sampling of the audio signal in the decoder stage may be performed by two alternative approaches. Fractionally-strided convolution (also known as transposed convolution) operations may be used in layers of the decoder stage. Alternatively, in each layer of the decoder stage, the filters may operate on the audio data input into each layer with a stride of 1, after up-sampling and interpolation is performed as in conventional signal processing with the up-sampling factor of 2.

In addition, an output layer (convolution layer) may subsequently follow the last layer of the decoder stage before the enhanced dynamic range reduced audio data are output in a final step. The output layer may, for example, include N=1 filters having a filter size of 31.

In the output layer, the activation may be different to the activation performed in the at least one of the encoder layers and the at least one of the decoder layers. The activation may be based, for example, on a tanh operation.

In between the encoder stage and the decoder stage, audio data may be modified to generate enhanced dynamic range reduced audio data. The modification may be based on a dynamic range reduced coded audio feature space (also known as bottleneck layer). A random noise vector, z, may be used in the dynamic range reduced coded audio feature space for modifying audio in the dynamic range reduced domain. The modification in the dynamic range reduced coded audio feature space may be done, for example, by concatenating the random noise vector (z) with the vector representation (c) of the dynamic range reduced raw audio data as output from the last layer in the encoder stage. The random noise vector may be set to z=0 as it was found that for coding artifact reduction setting the random noise vector to z=0 may yield the best results. Alternatively, or additionally, metadata may be input at this point to modify the enhanced dynamic range reduced audio data. In this, generation of the enhanced audio data may be conditioned based on given metadata.

Skip connections may exist between homologues layers of the encoder stage and the decoder stage. In this, the dynamic range reduced coded audio feature space as described above may be bypassed preventing loss of information. Skip connections may be implemented using one or more of concatenation and signal addition. Due to the implementation of skip connections, the number of filter outputs may be "virtually" doubled.

The architecture of the Generator may, for example, be summarized as follows (skip connections omitted):

input: dynamic range reduced raw audio data encoder layer L=1: filter number N=16, filter size=31, activation=PreLU encoder layer L=2: filter number N=32, filter size=31, activation=PreLU encoder layer L=11: filter number N=512, filter size=31 encoder layer L=12: filter number N=1024, filter size=31 dynamic range reduced coded audio feature space decoder layer L=1: filter number N=512, filter size=31 decoder layer L=10: filter number N=32, filter size=31, activation PreLU decoder layer L=11: filter number N=16, filter size=31, activation PreLU output layer: filter number N=1, filter size=31, activation tanh output enhanced audio data Depending on the application, the number of layers in the encoder stage and in the decoder stage of the Generator may, for example, be down-scaled or up-scaled, respectively. In general, the above Generator architecture offers the possibility of one-shot artifact reduction as no complex operation as in Wavenet or sampleRNN has to be performed.

Architecture of a Discriminator Trained in the Reduced Dynamic Range Domain

While the architecture of a Discriminator is not limited, the architecture of a Discriminator may follow the same one-dimensional convolutional structure as the encoder stage of a Generator described above. a Discriminator architecture may thus mirror the encoder stage of a Generator. A Discriminator may thus include a number of L layers, wherein each layer may include a number of N filters. L may be a natural number ≥1 and N may be a natural number ≥1. The size of the N filters is not limited and may also be chosen according to the requirements of the Discriminator. The filter size may, however, be the same in each of the L layers. A non-linear operation performed in at least one of the encoder layers of the Discriminator may include LeakyReLU.

Following the encoder stage, the Discriminator may include an output layer. The output layer may have N=1 filters having a filter size of 1. In this, the filter size of the output layer may be different from the filter size of the encoder layers. The output layer may thus be a one-dimensional convolution layer that does not down-sample hidden activations. This means that the filter in the output layer may operate with a stride of 1 while all previous layers of the encoder stage of the Discriminator may use a stride of 2. Alternatively, each of the filters in the previous layers of the encoder stage may operate with a stride of 4. This may enable to half the overall number of layers in the Discriminator.

The activation in the output layer may be different from the activation in the at least one of the encoder layers. The activation may be sigmoid. However, if a least squares training approach is used, sigmoid activation may not be required and is therefore optional.

The architecture of a Discriminator may, for example, be summarized as follows:

input enhanced dynamic range reduced audio data or original dynamic range reduced audio data encoder layer L=1: filter number N=16, filter size=31, activation=Leaky ReLU encoder layer L=2: filter number N=32, filter size=31, activation=Leaky ReLU encoder layer L=11: filter number N=1024, filter size=31, activation=Leaky ReLU output layer: filter number N=1, filter size=1, optionally: activation=sigmoid output (not shown): judgement on the input as real/fake in relation to original dynamic range reduced data and enhanced dynamic range reduced audio data generated by a Generator.

Depending on the application, the number of layers in the encoder stage of the Discriminator may, for example, be down-scaled or up-scaled, respectively.

Artistically Controlled Audio Enhancement

Audio coding and audio enhancement may become more related than they are today, because in the future, for example, decoder having implemented deep learning-based approaches, as for example described above, may make guesses at an original audio signal that may sound like an enhanced version of the original audio signal. Examples may include extending bandwidth or forcing decoded speech to be post-processed or decoded as clean speech. At the same time, results may not be "evidently coded" and sound wrong; a phonemic error may occur in a decoded speech signal, for example, without it being clear that the system, not the human speaker, made the error. This may be referred to as audio which sounds "more natural, but different from the original".

Audio enhancement may change artistic intent. For example, an artist may want there to be coding noise or deliberate band-limiting in a pop song. There may be coding systems (or at least decoders) which may be able to make the quality better than original, uncoded audio. There may be cases where this is desired. It is, however, only recently that cases have been demonstrated (e.g. speech and applause) where the output of a decoder may "sound better" than the input to the encoder.

In this context, methods and apparatus described herein deliver benefits to content creators, as well as everyone who uses enhanced audio, in particular, deep-learning based enhanced audio. These methods and apparatus are especially relevant in low bitrate cases where codec artifacts are most likely to be noticeable. A content creator may want to opt in or out of allowing a decoder to enhance an audio signal in a way that sounds "more natural, but different from the original." Specifically, this may occur in AC-4 multi-stream coding. In broadcast applications where the bitstream may include multiple streams and each has a low bitrate, it may be possible that the creator would maximize the quality with control parameters included in enhancement metadata for the lowest bitrate streams to mitigate the low bitrate coding artifacts.

In general, enhancement metadata may, for example, be encoder generated metadata for guiding audio enhancement by a decoder in a similar way as the metadata already referred to above including, for example, one or more of an encoding quality, bitstream parameters, an indication as to whether raw audio data are to be enhanced at all and companding control data. Enhancement metadata may, for example, be generated by an encoder alternatively or in addition to one or more of the aforementioned metadata depending on the respective requirements and may be transmitted via a bitstream together with encoded audio data. In some implementations, enhancement metadata may be generated based on the aforementioned metadata. Also, enhancement metadata may be generated based on presets (candidate enhancement metadata) which may be modified one or more times at the encoder side to generate the enhancement metadata to be transmitted and used at the decoder side. This process may involve user interaction, as detailed below, allowing for artistically controlled enhancement. The presets used for this purpose may be based on the aforementioned metadata in some implementations.

In this, significant benefit is offered versus general audio enhancement of an arbitrary signal, because the vast majority of signals are delivered via a bitrate constrained codec. If an enhancement system enhances audio before encoding, the benefit of the enhancement is lost when the low bitrate codec is applied. If audio is enhanced at the decoder, without input from the content creator, then the enhancement may not follow the creator's intent. The following table 1 clarifies this benefit:

TABLE 1

Benefits of artistically controlled audio enhancement

| System | Allow high quality output at decoder? | Follow creator's intent? |
|---|---|---|
| Encoder side enhancement only | No | Yes |
| Decoder side enhancement only | Yes | No |
| Artistically controlled enhancement | Yes | Yes |

Thus, methods and apparatus described herein provide a solution for coding and/or enhancing audio, in particular using deep learning, that is able to also preserve artistic intent, as the content creator is allowed to decide at the encoding side which one or more of decoding modes is available. Additionally, it is possible to transmit the settings selected by the content creator to the decoder as enhancement metadata parameters in a bitstream instructing the decoder as to the mode it should operate in and the (generative) model it should apply.

For purposes of understanding it is noted that the methods and apparatus described herein may be used in the following modes:

Mode 1: The encoder may enable a content creator to audition the decoder side enhancement, so that he or she may directly approve the respective enhancement or decline and change to then approve the enhancement. In this process, audio is encoded, decoded and enhanced, and the content creator may listen to the enhanced audio. He or she may say yes or no to the enhanced audio (and yes or no to various kinds and amounts of enhancement). This yes or no decision may be used to generate the enhancement metadata that will be delivered to a decoder together with the audio content for subsequent consumer use (in contrast to mode 2 as detailed below). Mode 1 may take some time—up to several minutes or hours—because the content creator has to actively listen to the audio. Of course, an automated version of mode 1 may also be conceivable which may may take much less time. In mode 1, typically audio is not delivered to a consumer with an exception for live broadcasts as detailed below. In mode 1, the only purpose of decoding and enhancing the audio is for auditioning (or automated assessment).

Mode 2: A distributor (like Netflix or BBC, for example) may send out encoded audio content. The distributor may also include the enhancement metadata generated in mode 1 for guiding the decoder side enhancement. This encoding and sending process may be instantaneous and may not involve auditioning, because auditioning was already part of generating the enhancement metadata in mode 1. The encoding and sending process may also happen on a different day than mode 1. The consumer's decoder then receives the encoded audio and the enhancement metadata generated in mode 1, decodes the audio, and enhances it in accordance with the enhancement metadata, which may also happen on a different day.

It is to be noted that for a live broadcast (e.g. sports, news), a content creator may be selecting the enhancement allowed live in real time, which may impact the enhancement metadata sent in real time as well. In this case, mode 1 and mode 2 co-occur because the signal listened to in auditioning may be the same one delivered to the consumer.

Figure 6:
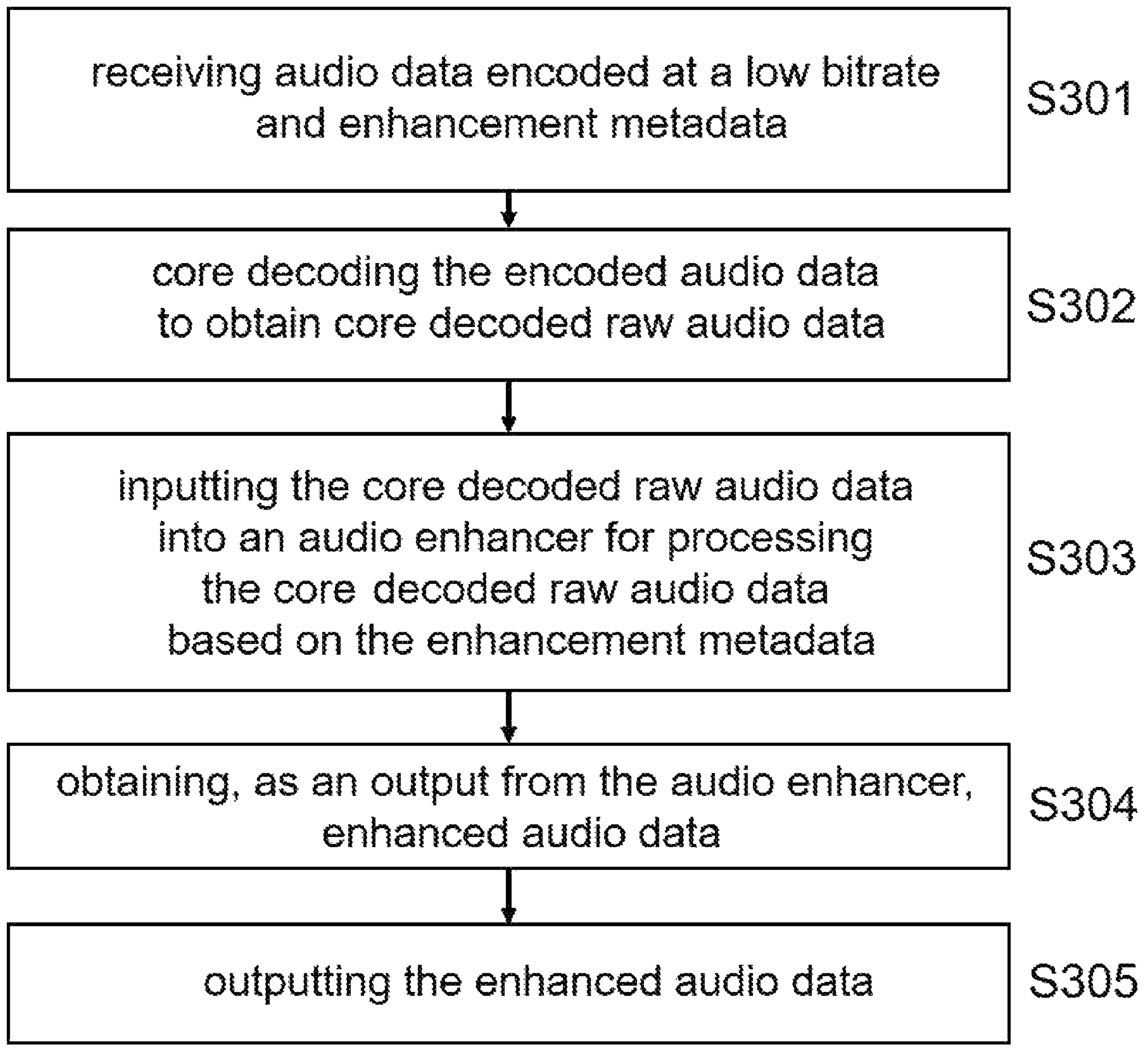
FIG. 6 illustrates an example of a method for generating enhanced audio data from low-bitrate coded audio data based on enhancement metadata.
Figure 7:
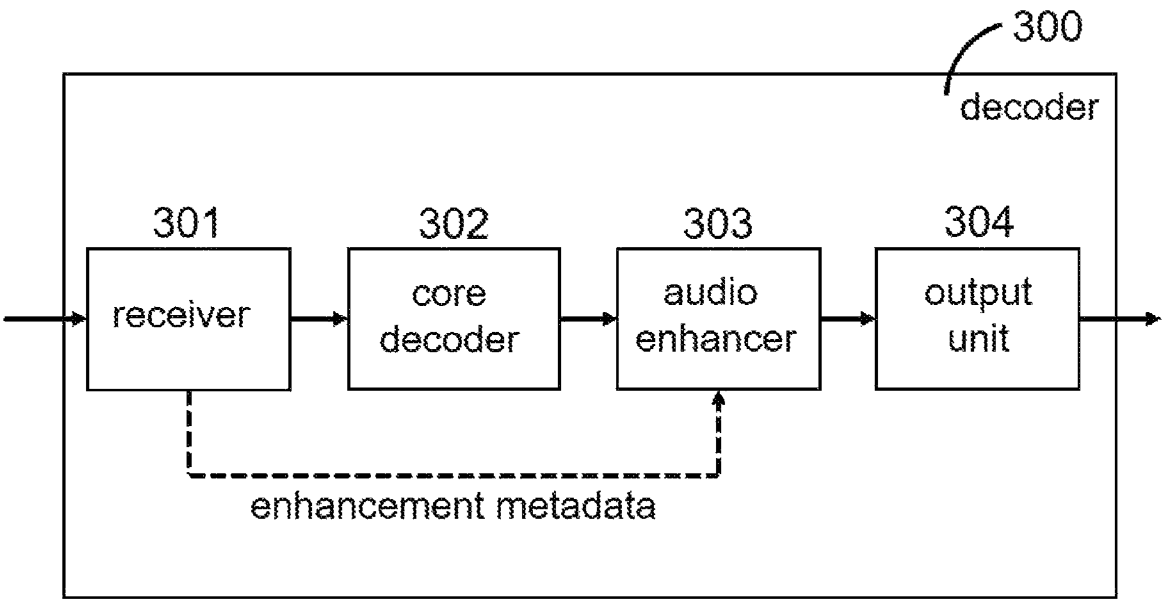
FIG. 7 illustrates an example of a decoder configured to perform a method for generating enhanced audio data from low-bitrate coded audio data based on enhancement metadata.
Figure 8:
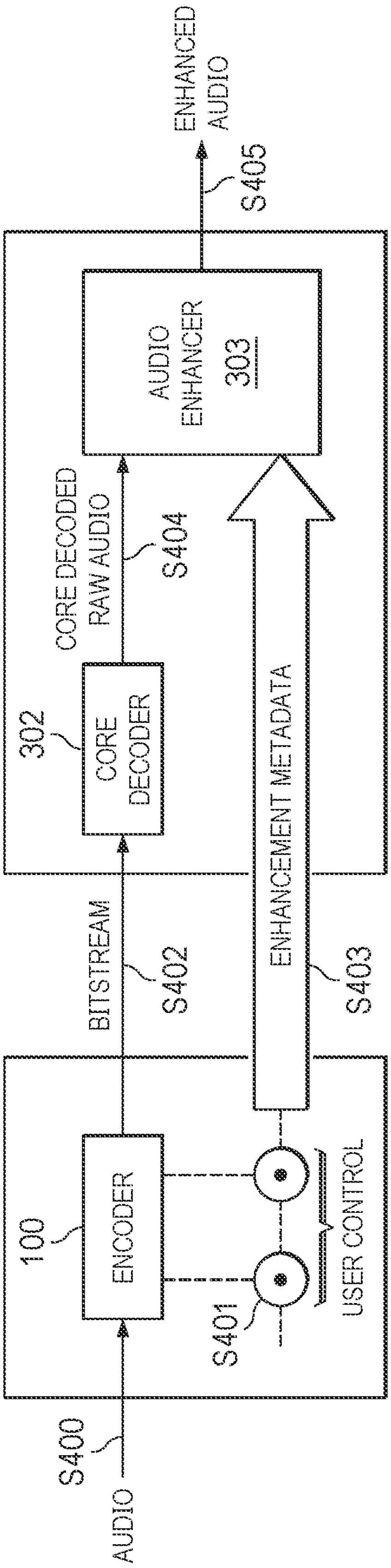
FIG. 8 illustrates an example of a system of an encoder configured to perform a method of low-bitrate coding of audio data and generating enhancement metadata for controlling audio enhancement of the low-bitrate coded audio data at a decoder side and a decoder configured to perform a method for generating enhanced audio data from low-bitrate coded audio data based on enhancement metadata.

In the following, the methods and apparatus are described in more detail with reference to the accompanying drawings, wherein FIGS. 1, 2 and 5 refer to automated generation of enhancement metadata at the encoder side and FIGS. 3 and 4 further refer in addition to content creator auditioning. FIGS. 6 and 7 moreover refer to the decoder side. FIG. 8 refers to a system of an encoder and a decoder in accordance with the above described mode 1.

It is to be noted that in the following the terms creator, artist, producer, and user (assuming it refers to creators, artists or producers) may be used interchangeably.

Generating Enhancement Metadata for Controlling Audio Enhancement of Low-Bitrate Coded Audio Data at Decoding Side Referring to the example of FIG. 1, a flow diagram of an example of a method of low-bitrate coding of audio data and generating enhancement metadata for controlling audio enhancement of the low-bitrate coded audio data at a decoder side is illustrated. In step S101, original audio data are core encoded to obtain encoded audio data. The original audio data may be encoded at a low bitrate. The codec used to encode the original audio data is not limited, any codec may be used, for example the OPUS codec.

In step S102, enhancement metadata are generated that are to be used for controlling a type and/or amount of audio enhancement at the decoder side after the encoded audio data have been core decoded. As already stated above, the enhancement metadata may be generated by an encoder to guide audio enhancement by a decoder in a similar way as the metadata mentioned above including, for example, one or more of an encoding quality, bitstream parameters, an indication as to whether raw audio data are to be enhanced at all and companding control data. Depending on the respective requirements, the enhancement metadata may be generated alternatively or in addition to one or more of these other metadata. Generating the enhancement metadata may be performed automatically. Alternatively, or additionally, generating the enhancement metadata may involve a user interaction (e.g. input of a content creator).

In step S103, the encoded audio data and the enhancement metadata are then output, for example, to be subsequently transmitted to a respective consumer's decoder via a low-bitrate audio bitstream (mode 1) or to a distributor (mode 2). In generating enhancement metadata at the encoder side, it is possible to allow, for example, a user (e.g. a content creator) to determine control parameters that enable to control a type and/or amount of audio enhancement at the decoder side when delivered to a consumer.

Figure 2:
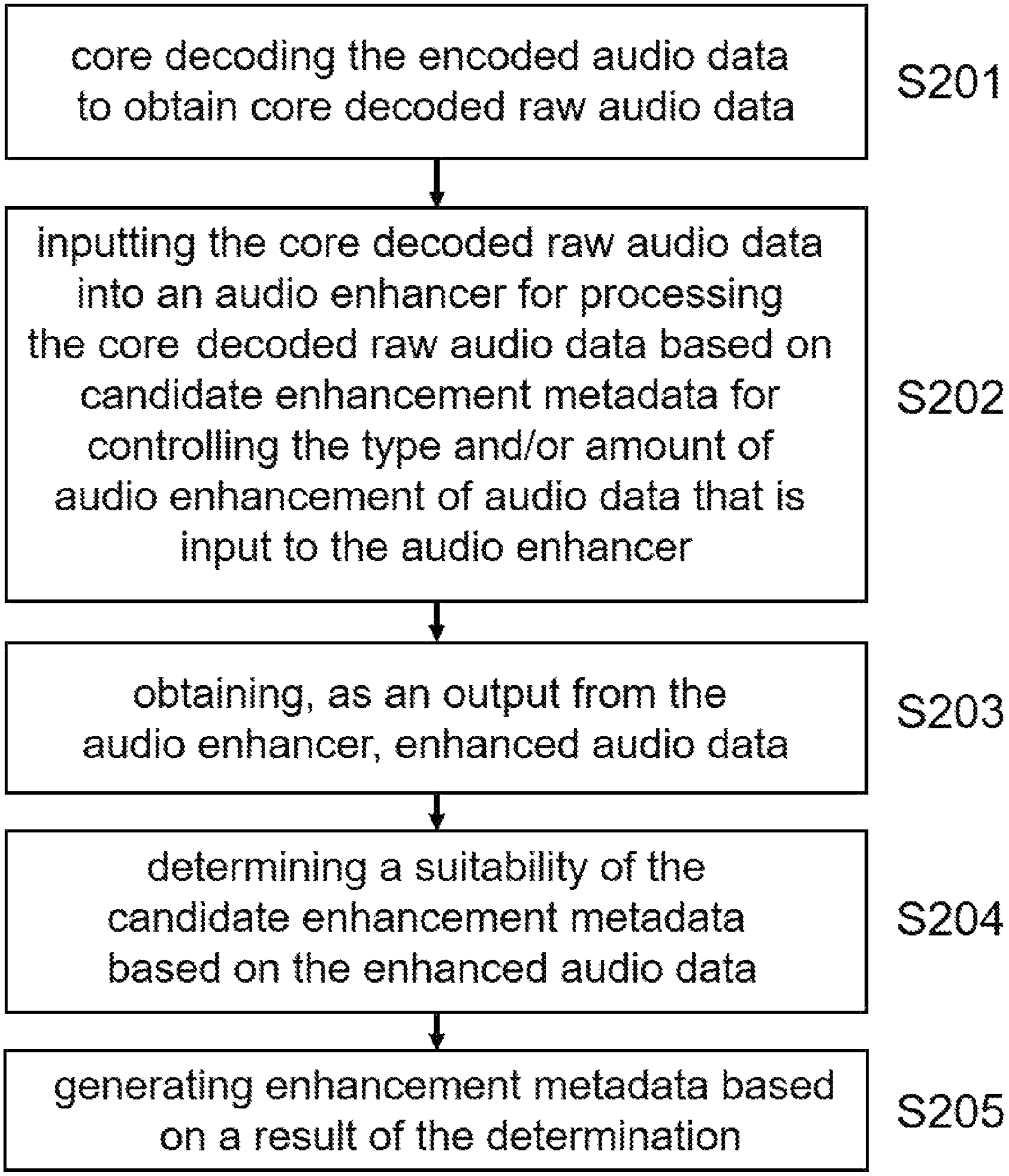
FIG. 2 illustrates a flow diagram of generating enhancement metadata to be used for controlling a type and/or amount of audio enhancement at the decoder side after core decoding the encoded audio data.

Referring now to the example of FIG. 2, a flow diagram of an example of generating enhancement metadata to be used for controlling a type and/or amount of audio enhancement at the decoder side after core decoding the encoded audio data is illustrated. In an embodiment, generating enhancement metadata in step S102 may include step S201 of core decoding the encoded audio data to obtain core decoded raw audio data.

The thus obtained raw audio data may then be input in step S202 into an audio enhancer for processing the core decoded raw audio data based on candidate enhancement metadata for controlling the type and/or amount of audio enhancement of audio data that is input to the audio enhancer. Candidate enhancement metadata may be said to correspond to presets that may still be modified at encoding side in order to generate the enhancement metadata to be transmitted and used at decoding side for guiding audio enhancement. Candidate enhancement metadata may either be predefined presets that may be readily implemented in an encoder, or may be presets input by a user (e.g. a content creator). In some implementations, the presets may be based on the metadata referred to above. The modification of the candidate enhancement metadata may be performed automatically. Alternatively, or additionally, the candidate enhancement metadata may be modified based on user inputs as detailed below.

In step S203, enhanced audio data are then obtained as an output from the audio enhancer. In an embodiment, the audio enhancer may be a Generator. The Generator itself is not limited. The Generator may be a Generator trained in a Generative Adversarial Network (GAN) setting, but also other generative models are conceivable. Also, sampleRNN or Wavenet are conceivable.

In step S204, the suitability of the candidate enhancement metadata is then determined based on the enhanced audio data. The suitability may, for example, be determined by comparing the enhanced audio data to the original audio data to determine, for example, coding noise or band-limiting being either deliberate or not. Determining the suitability of the candidate enhancement metadata may be an automated process, i.e. may be automatically performed by a respective encoder. Alternatively, or additionally, determining the suitability of the candidate enhancement metadata may involve user auditioning. Accordingly, a judgement of a user (e.g. a content creator) on the suitability of the candidate enhancement metadata may be enabled as also further detailed below.

Based on the result of this determination, in step S205, the enhancement metadata are generated. In other words, if the candidate enhancement metadata are determined to be suitable, the enhancement metadata are then generated based on the suitable candidate enhancement metadata.

Figure 3:
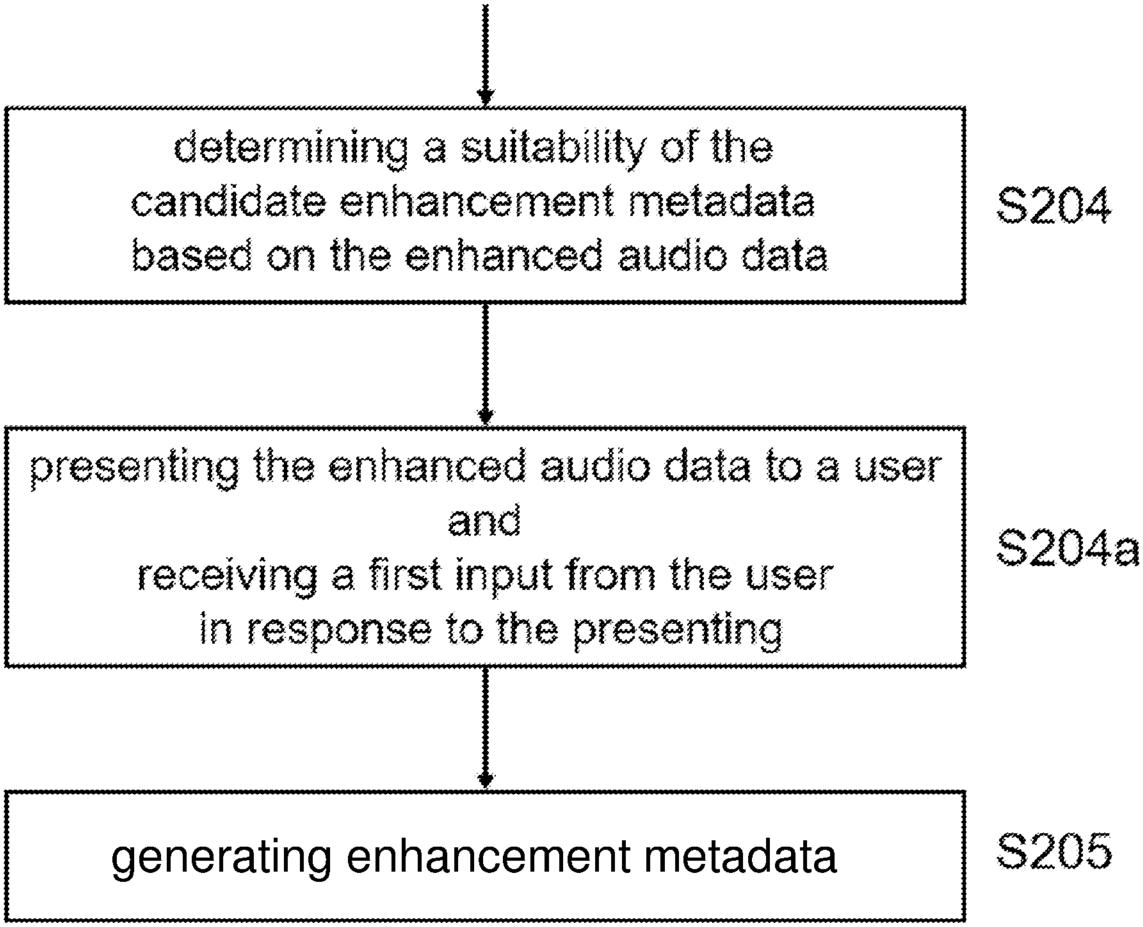
FIG. 3 illustrates a flow diagram of a further example of generating enhancement metadata to be used for controlling a type and/or amount of audio enhancement at the decoder side after core decoding the encoded audio data.

Referring now to the example of FIG. 3, a further example of generating enhancement metadata to be used for controlling a type and/or amount of audio enhancement at the decoder side after core decoding the encoded audio data is illustrated.

In an embodiment, step S204, determining the suitability of the candidate enhancement metadata based on the enhanced audio data, may include, step S204*a*, presenting the enhanced audio data to a user and receiving a first input from the user in response to the presenting. Generating the enhancement metadata in step S205 may then be based on the first input. The user may be a content creator. In presenting the enhanced audio data to a content creator, the content creator is given the possibility to listen to the enhanced audio data and to decide as to whether or not the enhanced audio data reflect artistic intent.

Figure 4:
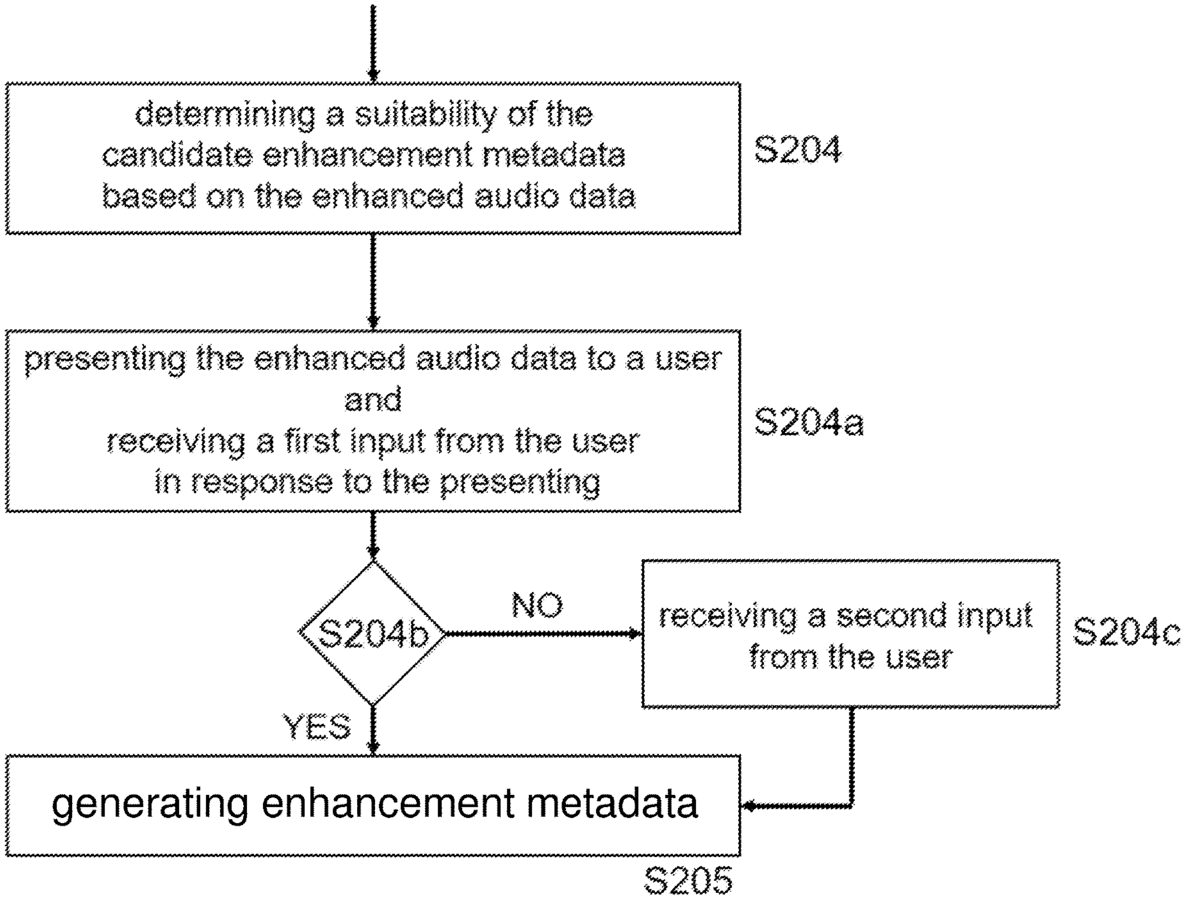
FIG. 4 illustrates a flow diagram of yet a further example of generating enhancement metadata to be used for controlling a type and/or amount of audio enhancement at the decoder side after core decoding the encoded audio data.

As illustrated in the example of FIG. 4, in an embodiment, the first input from the user may include an indication of whether the candidate enhancement metadata are accepted or declined by the user as illustrated in decision block S204*b* YES (accepting)/NO (declining) In an embodiment, in case of the user declining the candidate enhancement metadata, a second input indicating a modification of the candidate enhancement metadata may be received from the user in step S204*c* and generating the enhancement metadata in step S205 may be based on the second input. Such a second input may be, for example, input on a different set of candidate enhancement metadata (e.g. different preset) or input according to changes on the current set of candidate enhancement metadata (e.g. modifications on type and/or amount of enhancement as may be indicated by respective enhancement control data). Alternatively, or additionally, in an embodiment, in case of the user declining the candidate enhancement metadata, steps S202-S205 may be repeated. Accordingly, the user (e.g. content creator) may, for example, be able to repeatedly determine the suitability of respective candidate enhancement metadata in order to achieve a suitable result in an iterative process. In other words, the content creator may be given the possibility to repeatedly listen to the enhanced audio data in response to the second input and to decide as to whether or not the enhanced audio data then reflect artistic intent. In step S205, the enhancement metadata may then also be based on the second input.

In an embodiment, the enhancement metadata may include one or more items of enhancement control data. Such enhancement control data may be used at decoding side to control an audio enhancer to perform a desired type and/or amount of enhancement of respective core decoded raw audio data.

In an embodiment, the enhancement control data may include information on one or more types of audio enhancement (content cleanup type), the one or more types of audio enhancement including one or more of speech enhancement, music enhancement and applause enhancement.

Accordingly, it is possible to have a suite of (generative) models (e.g. GAN based model for music or sampleRNN-based model for speech) applying various forms of deep learning-based enhancement that could be applied at the decoder side according to a creator's input at the encoder side, for example, dialog centric, music centric, etc., i.e. depending on the category of the signal source. Because audio enhancement is likely to be content specific in the short term, a creator may also choose from available types of audio enhancement and indicate the types of audio enhancement to be used by a respective audio enhancer at the decoding side by setting the enhancement control data, respectively.

In an embodiment, the enhancement control data may further include information on respective allowabilities of the one or more types of audio enhancement.

In this context, a user (e.g. a content creator) may also be allowed to opt in or opt out to let a present or future enhancement system detect an audio type to perform the enhancement, for example, in view of a general enhancer (speech, music, and other, for example) being developed, or an auto-detector which may choose a specific enhancement type (speech, music, or other, for example). In this, the term allowability may also be said to encompass an allowability of detecting an audio type in order to perform a type of audio enhancement subsequently. The term allowability may also be said to encompass a "just make it sound great option". In this case, it may be allowed that all aspects of the audio enhancement are chosen by the decoder. It may be disclosed to a user that this setting "aims to create the most natural sounding, highest quality perceived audio, free of artifacts that tend to be produced by codecs." Thus, if a user (e.g. content creator) desires to create codec noise, he or she would deactivate this mode during such segments. An automated system to detect codec noise could also be used to detect such a case and automatically deactivate enhancement (or propose deactivation of enhancement) at the relevant time.

Alternatively, or additionally, in an embodiment, the enhancement control data may further include information on an amount of audio enhancement (amount of content cleanup allowed).

Such an amount may have a range from "none" to "lots". In other words, such settings may correspond to encoding audio in a generic way using typical audio coding (none) versus professionally produced audio content regardless of the audio input (lots). Such a setting may also be allowed to change with bitrate, with default values increasing as bitrate decreases.

Alternatively, or additionally, in an embodiment, the enhancement control data may further include information on an allowability as to whether audio enhancement is to be performed by an automatically updated audio enhancer at the decoder side (e.g. updated enhancement).

As deep learning enhancement is an active research and future product area where capabilities are rapidly improving, this setting allows the user (e.g. content creator) to opt in or opt out to allowing future versions of enhancement (e.g. Dolby enhancement) to be applied, not just the version the user may audition when making his or her choice.

Alternatively, or additionally, processing the core decoded raw audio data based on the candidate enhancement metadata in step S202 may be performed by applying one or more predefined audio enhancement modules, and the enhancement control data may further include information on an allowability of using one or more different enhancement modules at decoder side that achieve the same or substantially the same type of enhancement.

Accordingly, even if the enhancement modules at the encoding side and the decoding side differ, the artistic intent can be preserved during audio enhancement as the same or substantially the same type of enhancement is achieved.

Figure 5:
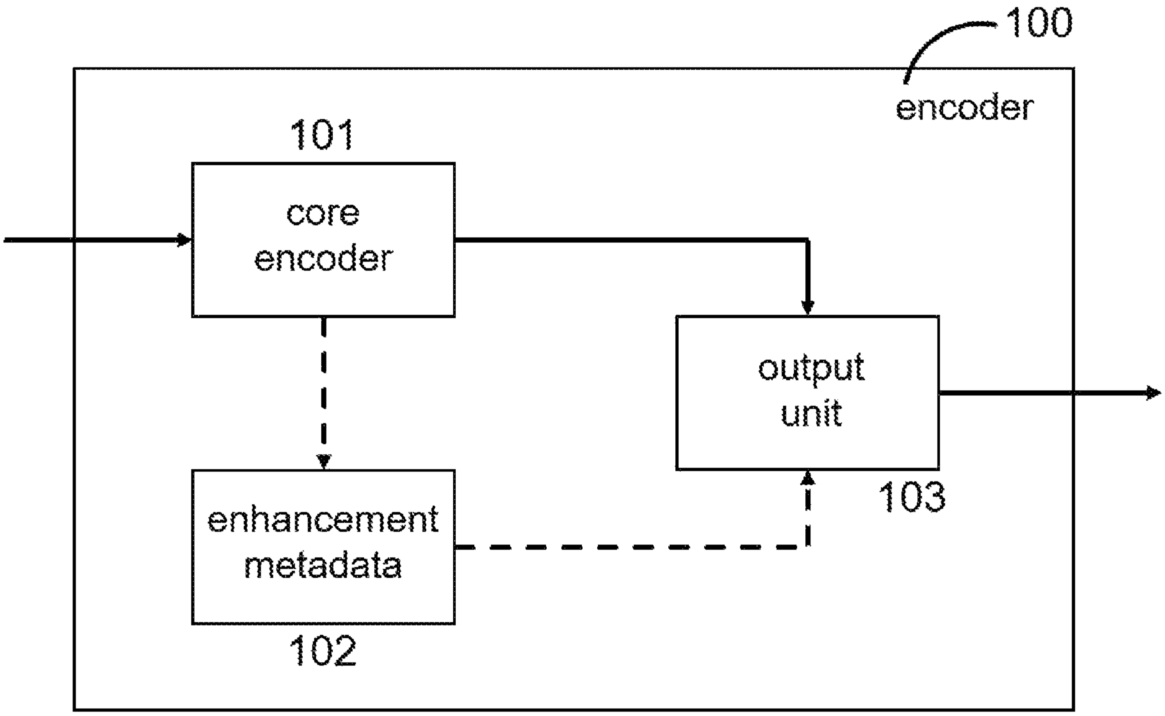
FIG. 5 illustrates an example of an encoder configured to perform a method of low-bitrate coding of audio data and generating enhancement metadata for controlling audio enhancement of the low-bitrate coded audio data at a decoder side.

Referring now to the example of FIG. 5, an example of an encoder configured to perform the above described method is illustrated. The encoder 100 may include a core encoder 101 configured to core encode original audio data at a low bitrate to obtain encoded audio data. The encoder 100 may further be configured to generate enhancement metadata 102 to be used for controlling a type and/or amount of audio enhancement at the decoder side after core decoding the encoded audio data. As already mentioned above, generation of the enhancement metadata may be performed automatically.

Alternatively, or additionally, the generation of the enhancement metadata may involve user inputs. And the encoder may include an output unit 103 configured to output the encoded audio data and the enhancement metadata (delivered subsequently to a consumer for controlling audio enhancement at the decoding side in accordance with mode 1 or to a distributor in accordance with mode 2).

Figure 9:
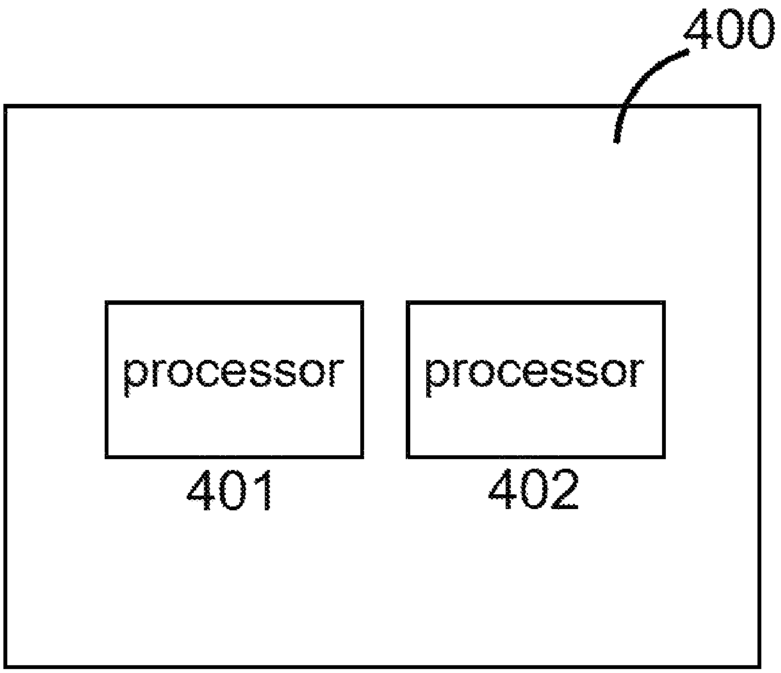
FIG. 9 illustrates an example of a device having two or more processors configured to perform the methods described herein.

Alternatively, or additionally the encoder may be realized as a device 400 including one or more processors 401, 402 configured to perform the above described method as exemplarily illustrated in FIG. 9.

Alternatively, or additionally, the above method may be implemented by a respective computer program product comprising a computer-readable storage medium with instructions adapted to cause a device to carry out the above method when executed on a device having processing capability.

Generating Enhanced Audio Data from Low-Bitrate Coded Audio Data Based on Enhancement Metadata Referring now to the example of FIG. 6, an example of a method for generating enhanced audio data from low-bitrate coded audio data based on enhancement metadata is illustrated. In step S301, audio data encoded at a low bitrate and enhancement metadata are received. The encoded audio data and the enhancement metadata may, for example, be received as a low-bitrate audio bitstream.

The low-bitrate audio bitstream may then, for example, be demultiplexed into the encoded audio data and the enhancement metadata, wherein the encoded audio data are provided to a core decoder for core decoding and the enhancement metadata are provided to an audio enhancer for audio enhancement.

In step S302, the encoded audio data are core decoded to obtain core decoded raw audio data, which are then input, in step S303, into an audio enhancer for processing the core decoded raw audio data based on the enhancement metadata. In this, audio enhancement may be guided by one or more items of enhancement control data included in the enhancement metadata as detailed above. As the enhancement metadata may have been generated under consideration of artistic intent (automatically and/or based on a content creator's input), the enhanced audio data being obtained in step S304 as an output from the audio enhancer may reflect and preserve artistic intent. In step S305, the enhanced audio data are then output, for example, to a listener (consumer).

In an embodiment, processing the core decoded raw audio data based on the enhancement metadata may be performed by applying one or more audio enhancement modules in accordance with the enhancement metadata. The audio enhancement modules to be applied may be indicated by enhancement control data included in the enhancement metadata as detailed above.

Alternatively, or additionally, processing the core decoded raw audio data based on the enhancement metadata may be performed by an automatically updated audio enhancer if a respective allowability is indicated in the enhancement control data as detailed above.

While the type of the audio enhancer is not limited, in an embodiment, the audio enhancer may be a Generator. The Generator itself is not limited. The Generator may be a Generator trained in a Generative Adversarial Network (GAN) setting, but also other generative models are conceivable. Also, sampleRNN or Wavenet are conceivable.

Referring to the example of FIG. 7, an example of a decoder configured to perform a method for generating enhanced audio data from low-bitrate coded audio data based on enhancement metadata is illustrated. The decoder 300 may include a receiver 301 configured to receive audio data encoded at a low bitrate and enhancement metadata, for example, via a low-bitrate audio bitstream. The receiver 301 may be configured to provide the enhancement metadata to an audio enhancer 303 (as illustrated by the dashed lines) and the encoded audio data to a core decoder 302. In case a low-bitrate audio bitstream is received, the receiver 301 may further be configured to demultiplex the received low-bitrate audio bitstream into the encoded audio data and the enhancement metadata. Alternatively, or additionally the decoder 300 may include a demultiplexer. As already mentioned, the decoder 300 may include a core decoder 302 configured to core decode the encoded audio data to obtain core decoded raw audio data. The core decoded raw audio data may then be input into an audio enhancer 303 configured to process the core decoded raw audio data based on the enhancement metadata and to output enhanced audio data. The audio enhancer 303 may include one or more audio enhancement modules to be applied to the core decoded raw audio data in accordance with the enhancement metadata. While the type of the audio enhancer is not limited, in an embodiment, the audio enhancer may be a Generator. The Generator itself is not limited. The Generator may be a Generator trained in a Generative Adversarial Network (GAN) setting, but also other generative models are conceivable. Also, sampleRNN or Wavenet are conceivable.

Alternatively, or additionally the decoder may be realized as a device 400 including one or more processors 401, 402 configured to perform the method for generating enhanced audio data from low-bitrate coded audio data based on enhancement metadata as exemplarily illustrated in FIG. 9. Alternatively, or additionally, the above method may be implemented by a respective computer program product comprising a computer-readable storage medium with instructions adapted to cause a device to carry out the above method when executed on a device having processing capability.

Referring now to the example of FIG. 8, the above described methods may also be implemented by a system of an encoder being configured to perform a method of low-bitrate coding of audio data and generating enhancement metadata for controlling audio enhancement of the low-bitrate coded audio data at a decoder side and a respective decoder configured to perform a method for generating enhanced audio data from low-bitrate coded audio data based on enhancement metadata. As illustrated in the example of FIG. 8, the enhancement metadata are transmitted via the bitstream of encoded audio data from the encoder to the decoder.

The enhancement metadata parameter may further be updated at some reasonable frequency, for example, segments on the order of a few seconds to a few hours with time resolution of boundaries of a reasonable fraction of a second, or a few frames. An interface for the system may allow real-time live switching of the setting, changes to the settings at specific time points in a file, or both.

In addition, there may be provided a cloud storage mechanism for the user (e.g. content creator) to update the enhancement metadata parameters for a given piece of content. This may function in coordination with IDAT (ID and Timing) metadata information carried in a codec, which may provide an index to a content item.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The invention claimed is:

1. A method of compressed-bitrate coding of audio data and generating enhancement metadata for controlling audio enhancement of the compressed-bitrate coded audio data in a decoder at a decoder side, including:

core encoding original audio data at a compressed bitrate to obtain encoded audio data;

generating, in an encoder, enhancement metadata to be transmitted to the decoder for controlling a type and/or amount of audio enhancement in the decoder after core decoding the encoded audio data; and outputting the encoded audio data and the enhancement metadata to the decoder, wherein generating enhancement metadata includes:

core decoding the encoded audio data to obtain core decoded raw audio data;

inputting the core decoded raw audio data, companding control data, and a noise vector into an audio enhancer for processing the core decoded raw audio data based on candidate enhancement metadata for controlling the type and/or amount of audio enhancement of audio data that is input to the audio enhancer, wherein the companding control data includes information on a companding mode used for encoding the original audio data;

obtaining, as an output from the audio enhancer, enhanced audio data;

wherein the audio enhancer is trained using machine learning to generate enhanced audio from original audio, the companding control data, and the noise vector until a discriminator no longer distinguishes the original audio from the enhanced audio generated from the original audio;

determining a suitability of the candidate enhancement metadata based on the enhanced audio data; and generating the enhancement metadata based on a result of the determination.

2. The method of claim 1, wherein determining the suitability of the candidate enhancement metadata in determining a suitability includes presenting the enhanced audio data to a user and receiving a first input from the user in response to the presenting, and wherein generating the enhancement metadata based on the result of the determination is based on the first input.

3. The method of claim 2, wherein the first input from the user includes an indication of whether the candidate enhancement metadata are accepted or declined by the user.

4. The method of claim 3, wherein, in case of the user declining the candidate enhancement metadata, a second input indicating a modification of the candidate enhancement metadata is received from the user and generating the enhancement metadata based on the result of the determination is based on the second input.

5. The method of claim 3, wherein, in case of the user declining the candidate enhancement metadata, operations of inputting the core decoded raw audio data, obtaining the enhanced audio data, determining the suitability and generating the enhancement metadata based on the result of the determination are repeated.

6. The method of claim 1, wherein the enhancement metadata include one or more items of enhancement control data.

7. The method of claim 6, wherein the enhancement control data include information on one or more types of audio enhancement, the one or more types of audio enhancement including one or more of speech enhancement, music enhancement and applause enhancement.

8. The method of claim 7, wherein the enhancement control data further include information on respective allowabilities of the one or more types of audio enhancement.

9. The method of claim 6, wherein the enhancement control data further include information on an amount of audio enhancement.

10. The method of claim 6, wherein the enhancement control data further include information on an allowability as to whether audio enhancement is to be performed by an automatically updated audio enhancer at the decoder side.

11. The method of claim 6, wherein processing the core decoded raw audio data based on the candidate enhancement metadata is performed by applying one or more predefined audio enhancement modules, and wherein the enhancement control data further include information on an allowability of using one or more different enhancement modules at decoder side that achieve the same or substantially the same type of enhancement.

12. The method of claim 1, wherein the audio enhancer is a Generator trained in a Generative Adversarial Network setting.

13. The method of claim 12, wherein, during training in the Generative Adversarial Network, obtaining the enhanced audio data as output of the Generator is conditioned based on the enhancement metadata.

14. The method of claim 1, wherein the enhancement metadata include at least an indication of an encoding quality of the original audio data.

15. The method of claim 1, wherein the enhancement metadata include one or more bitstream parameters.

16. The method of claim 15, wherein the one or more bitstream parameters include one or more of a bitrate, a scale factor values related to AAC-based codecs and Dolby AC-4 codec and a Global Gain related to AAC-based codec.

17. The method of claim 15, wherein the one or more bitstream parameters are used to guide enhancement of original audio data in a Generator trained in a Generative Adversarial Network setting; wherein the one or more bitstream parameters include an indication on whether to enhance the decoded raw audio data by the Generator.

18. An encoder for generating enhancement metadata for controlling enhancement of compressed-bitrate coded audio data, wherein the encoder includes one or more processors configured to perform the method according to claim 1.

19. A computer program product comprising a computer-readable storage medium with instructions adapted to cause a device to carry out the method according to claim 1 when executed on a device having processing capability.

20. A method for generating in a decoder enhanced audio data from compressed-bitrate coded audio data based on enhancement metadata, wherein the method includes:

receiving audio data encoded at a compressed bitrate and enhancement metadata from an encoder;

core decoding the encoded audio data to obtain core decoded raw audio data;

inputting the core decoded raw audio data, companding control data, and a noise vector into an audio enhancer for processing the core decoded raw audio data based on enhancement metadata, wherein the companding control data includes information on a companding mode used for encoding the original audio data;

obtaining, as an output from the audio enhancer, enhanced audio data;

wherein the audio enhancer is trained using machine learning to generate enhanced audio from original audio, the companding control data, and the noise vector until a discriminator no longer distinguishes the original audio from the enhanced audio data; and outputting the enhanced audio data, wherein the audio enhancer is a Generator trained in a Generative Adversarial Network (GAN) setting.

21. The method of claim 20, wherein processing the core decoded raw audio data based on the enhancement metadata is performed by applying one or more audio enhancement modules in accordance with the enhancement metadata.

22. The method of claim 20, wherein, during training in the Generative Adversarial Network, obtaining the enhanced audio data as output of the Generator is conditioned based on the enhancement metadata.

23. The method of claim 20, wherein the enhancement metadata include at least an indication of an encoding quality of the original audio data.

24. The method of claim 20, wherein the enhancement metadata include one or more bitstream parameters.

25. The method of claim 24, wherein the one or more bitstream parameters include one or more of a bitrate, a scale factor values related to AAC-based codecs and Dolby AC-4 codec and a Global Gain related to AAC-based codec.

26. A decoder for generating enhanced audio data from compressed-bitrate coded audio data based on enhancement metadata, wherein the decoder includes one or more processors configured to perform the method of claim 20.

27. A computer program product comprising a computer-readable storage medium with instructions adapted to cause a device to carry out the method according to claim 20 when executed on a device having processing capability.

* * * * *